(12) United States Patent
Honma et al.

(10) Patent No.: US 7,666,113 B2
(45) Date of Patent: Feb. 23, 2010

(54) CONTROL APPARATUS AND METHOD FOR AUTOMATIC TRANSMISSION

(75) Inventors: Tomoaki Honma, Kanagawa (JP);
Masaaki Uchida, Kanagawa (JP);
Shusaku Katakura, Kanagawa (JP);
Yoshinobu Kawamoto, Kanagawa (JP);
Sadamu Fujiwara, Kanagawa (JP)

(73) Assignee: Jatco Ltd, Fuji-shi (JP)

( * ) Notice: Subject to any disclaimer, the term of this patent is extended or adjusted under 35 U.S.C. 154(b) by 359 days.

(21) Appl. No.: 11/772,988

(22) Filed: Jul. 3, 2007

(65) Prior Publication Data
US 2008/0017467 A1    Jan. 24, 2008

(30) Foreign Application Priority Data
Jul. 18, 2006    (JP) .............................. 2006-196137

(51) Int. Cl.
*F16H 31/00*    (2006.01)

(52) U.S. Cl. ...................... 475/132; 475/139; 475/140

(58) Field of Classification Search ................ 477/127, 477/130–132, 138–140
See application file for complete search history.

(56) References Cited

U.S. PATENT DOCUMENTS

| | | | |
|---|---|---|---|
| 5,609,068 | A | 3/1997 | Gruhle et al. |
| 5,782,711 | A | 7/1998 | Tsutsui et al. |
| 5,795,265 | A | 8/1998 | Domian et al. |
| 5,908,370 | A | 6/1999 | Kubo et al. |
| 6,514,166 | B2 | 2/2003 | Yuasa et al. |
| 6,684,144 | B2 * | 1/2004 | Sekii et al. ..................... 701/51 |
| 6,832,978 | B2 | 12/2004 | Buchanan et al. |
| 6,887,184 | B2 | 5/2005 | Buchanan et al. |
| 6,909,955 | B2 | 6/2005 | Vukovich et al. |
| 7,037,239 | B2 | 5/2006 | Werner et al. |
| 7,039,516 | B2 * | 5/2006 | Yamaguchi et al. ........... 701/51 |
| 7,131,933 | B2 * | 11/2006 | Tabata ......................... 477/181 |
| 7,563,196 | B2 * | 7/2009 | Yamada et al. ............... 477/110 |

FOREIGN PATENT DOCUMENTS

JP    02-080853 A    3/1990

(Continued)

OTHER PUBLICATIONS

U.S. Appl. No. 11/828,044, filed Jul. 25, 2007, Honma et al.

(Continued)

*Primary Examiner*—Ha D. Ho
(74) *Attorney, Agent, or Firm*—Foley & Lardner LLP

(57) ABSTRACT

A control apparatus of an automatic transmission having first and second frictional engagement elements that achieve higher and lower speed gear stages respectively, includes a target value determination section setting a rotation speed difference between input and output sides of the frictional engagement element, a total torque capacity calculation section calculating a total torque capacity, a distribution ratio determination section setting a distribution ratio of the total torque capacity to the first and second frictional engagement elements, an individual torque capacity calculation section calculating individual torque capacities respectively required of the first and second frictional engagement elements, and an engagement control section controlling engagement conditions of the first and second frictional engagement elements in accordance with the individual torque capacity. The automatic transmission realizes a down-shift by changeover between first and second frictional engagement elements based on the individual torque capacity during a vehicle power-off travel.

27 Claims, 13 Drawing Sheets

FOREIGN PATENT DOCUMENTS

| | | |
|---|---|---|
| JP | 08-503764 A | 4/1996 |
| JP | 08-184369 A | 7/1996 |
| JP | 9-170654 A | 6/1997 |
| JP | 09-296862 A | 11/1997 |
| JP | 10-502438 A | 3/1998 |
| JP | 2000-110929 A | 4/2000 |
| JP | 2001-124196 A | 5/2001 |
| JP | 2001-235024 A | 8/2001 |
| JP | 2004-251456 A | 9/2004 |
| JP | 2004-538213 A | 12/2004 |

OTHER PUBLICATIONS

U.S. Appl. No. 11/772,963, filed Jul. 3, 2007, Honma et al.

* cited by examiner

| | 1ST | 2ND |
|---|---|---|
| CLUTCH A | ● ← | ○ |
| CLUTCH B | ● | ● |
| CLUTCH C | ○ ← | ● |
| CLUTCH D | ○ | ○ |
| CLUTCH E | ○ | ○ |

○ RELEASE CONDITION
● ENGAGED CONDITION

CONTROL APPARATUS AND METHOD FOR AUTOMATIC TRANSMISSION

BACKGROUND OF THE INVENTION

The present invention relates to a control apparatus and controlling method for an automatic transmission that appropriately changes a rotation input from an engine and outputs it by engaging certain frictional engagement elements from a plurality of the frictional engagement elements in accordance with a speed gear, and more particularly to a control apparatus and controlling method for the automatic transmission performing a down-shift by way of changeover between a first frictional engagement element that achieves a higher speed before a gear shift and a second frictional engagement element that achieves a lower speed after the gear shift in a power-off condition during vehicle travel.

In general, when performing a gear shift by an automatic transmission, a changeover from disengagement (release) to engagement or vice versa of such a frictional engagement element as the clutch is done. At the changeover, it is desirable that the disengagement and engagement of the frictional engagement element should be achieved smoothly and promptly without a shock at the shift. Various kinds of arts or methods, then, are proposed and developed, and they are disclosed, for instance, in Japanese Patent Provisional Publication No. 9-170654 (hereinafter is referred to as "JP9-170654") and Japanese Patent Provisional Publication No. 2000-110929 (hereinafter is referred to as "JP2000-110929").

In JP9-170654, an oil pressure to a hydraulic servo, of a frictional engagement element is controlled, and the shock can be reduced. As described in Abstract in JP9-170654, with respect to an engagement side frictional engagement element that is going to be changed from a disengaged (release) condition to an engaged condition, a target oil pressure $P_{TA}$ at the initiation of inertia phase is calculated in accordance with an input torque. And a desired gradient is calculated by this target oil pressure and a predetermined time $t_{TA}$, then the oil pressure is increased with the calculated gradient as a first sweep-up. Further, a relatively moderate gradient $\delta P_{TA}$ is calculated and set based on a target rate of change of rotation at a time when an input shaft rpm $N_T$ starts changing. When the oil pressure reaches the target oil pressure $P_{TA}$, the oil pressure is increased with this relatively moderate gradient as a second sweep-up, and the second sweep-up is continued until variations $\Delta N$ of the input shaft rpm $N_T$ reaches a predetermined shift-start-judgment rpm dNs, which is an rpm that is able to be detected by an input shaft rpm sensor. After that, the oil pressure is feedback-controlled with a predetermined gradient while detecting the variations of the input shaft rpm. Further, a target shift start time and a rate of change of rpm at the time of the target shift start are measured, then the target oil pressure $P_{TA}$, the gradient $\delta P_{TA}$ of the second sweep-up section and a target shift start time $t_{aim}$ are learned and corrected.

On the other hand, in JP2000-110929, changes in torque input to a transmission is detected whenever the input torque change occurs during the shift performed by way of changeover of the frictional engagement elements. And in the case of occurrence of the input torque change during the shift, working fluid pressures of engagement side and disengagement side frictional engagement elements can be changed to pressures determined according to the input torque after the occurrence of torque change. With this, occurrence of engine racing, shift delay and a large incoming torque can be prevented without excess and deficiency of capacity against the input torque change of the transmission. As described in Abstract in JP2000-110929, during an up-shift by changeover being performed such that an engagement side working fluid pressure command value Pc is increased as shown by a solid line in a drawing and a disengagement side working fluid pressure command value $P_O$ is lowered as shown by another solid line, when a transmission input torque Ti changes at a time $t_2$, a lowering preliminary pressure $P_{O1}$ of $P_O$ is changed to a value determined according to Ti after the torque change, and a lowering gradient of $P_O$ is changed after the time $t_2$ as shown by a two-dot chain line. When Ti becomes a predetermined value or more at time $t_5$, a torque phase ramp gradient $\theta_5$ of Pc is determined, and an increasing gradient of $P_C$ is changed from a normal gradient $\theta_1$ to the steep gradient $\theta_5$ as shown by another two-dot chain line. After that, when Ti changes at time $t_7$, as shown by a two-dot chain line, the torque phase ramp gradient $\theta_3$ of Pc is changed to a gradient determined according to Ti after the torque change. When the change of Ti occurs at time $t_{10}$, a shelf pressure $P_{C1}$ of $P_C$ and a shelf pressure $P_{O1}$ of $P_O$ are changed to values determined according to Ti after the torque change as shown by two-dot chain lines.

SUMMARY OF THE INVENTION

In the above JP9-170654, with respect to the engagement side frictional engagement element, the target oil pressure $P_{TA}$ at the initiation of inertia phase is calculated in accordance with the input torque. However, after the initiation of the inertia phase, the frictional engagement element is controlled based on the oil pressure (while watching or checking the oil pressure). As for a disengagement side frictional engagement element that is going to be changed from the engaged condition to the disengaged (release) condition, a disengagement side torque and a disengagement side oil pressure are calculated based on the input torque and the engagement side oil pressure. However, in the same manner as the engagement side frictional engagement element, after the initiation of the inertia phase, the frictional engagement element is controlled based on the oil pressure. Since both the engagement side and disengagement side frictional engagement elements are controlled according to the oil pressure, in a case where two frictional engagement elements are controlled at the same time, a special mathematical calculations or control program programmed with consideration given to the characteristic of each frictional engagement element is required.

Furthermore, regarding the changeover of the frictional engagement element at the shift, if it can be controlled not only at the inertia phase but also during the progress of the engagement/disengagement of the each frictional engagement element on the basis of a condition of difference in rotation between input and output of the each frictional engagement element and/or a condition of distribution of a transmission torque between the engagement side and disengagement side frictional engagement elements, a smoother and more stable shift control could be realized without the shock. However, in JP9-170654, a relationship of outcomes of the control between the engagement side and disengagement side frictional engagement elements is complicated, so it is difficult to adopt the above shift control based on the condition of difference in rotation and the condition of the transmission torque distribution for JP9-170654.

On the other hand, as for the shift control in JP2000-110929, since the two frictional engagement elements are controlled by separate logic, an actual total amount of torque transmission capacity of both frictional engagement elements and an actual torque distribution amount of each frictional engagement element are ambiguities or not clear. Because of this, it is difficult to independently execute the difference rotation control of the each frictional engagement element and the torque distribution ratio control of the both frictional engagement elements. Thus, if the changeover control of the frictional engagement elements is carried out based on the condition of difference in rotation and the condition of the transmission torque distribution in JP2000-110929 like the above shift control, a significantly large time and manpower to develop this shift control are required.

It is therefore an object of the present invention to provide a control apparatus and controlling method for the automatic transmission performing the down-shift by way of changeover of frictional engagement elements in the power-off condition during vehicle travel, which can easily realize the smoother and more stable shift control based on the condition of difference in rotation between input and output of the each frictional engagement element and the condition of the transmission torque distribution between the engagement side and disengagement side frictional engagement elements and can easily be applied to a variety of automatic transmissions.

According to one aspect of the present invention, a control apparatus of an automatic transmission performing a down-shift by changeover between first and second frictional engagement elements that achieve higher and lower speed gear stages before and after the down-shift respectively during a vehicle power-off travel, comprises: a target value determination section setting (a) each target difference revolution speed of the first and second frictional engagement elements, which is a target value of a difference in rotation speed between input and output sides of the respective frictional engagement elements, at a time of the down-shift, and (b) the target difference revolution speed for the first frictional engagement element at a steady vehicle travel before an execution of the down-shift under the power-off condition; a total torque capacity calculation section calculating a total torque capacity required of the first and second frictional engagement elements to obtain the target difference revolution speed set by the target value determination section; a distribution ratio determination section setting a distribution ratio of the total torque capacity to the first and second frictional engagement elements; an individual torque capacity calculation section calculating individual torque capacities respectively required of the first and second frictional engagement elements based on the total torque capacity calculated by the total torque capacity calculation section and the distribution ratio set by the distribution ratio determination section; and an engagement control section controlling engagement conditions of the first and second frictional engagement elements in accordance with the individual torque capacity calculated by the individual torque capacity calculation section.

According to another aspect of the invention, a method for controlling an automatic transmission that changes a rotation input from an engine to an input member of the transmission and outputs the rotation by engaging a frictional engagement element and performs a down-shift by changeover between a first frictional engagement element for achieving a higher speed gear stage before the down-shift and a second frictional engagement element for achieving a lower speed gear stage after the down-shift in a power-off condition during vehicle travel, the method comprises: a preliminary phase step of: controlling an engagement condition of the first frictional engagement element so that a difference in rotation speed between input and output sides of the first frictional engagement element becomes a first target difference revolution speed; and wherein, in a case where a mechanical operation of a power train element except the engagement/release of the first and second frictional engagement elements is required, executing the mechanical operation under a condition where an input torque to the transmission is transmitted by the first frictional engagement element, and a changeover phase step of: after the preliminary phase step, controlling each torque capacity distribution ratio of the first and second frictional engagement elements so that transmission of the input torque shifts from the condition where the input torque is transmitted by only the first frictional engagement element to a condition where the input torque is transmitted by only the second frictional engagement element in the automatic transmission, and an inertia phase step of: after the changeover phase, setting a second target difference revolution speed that is a target value of a difference in rotation speed between input and output sides of the second frictional engagement element; controlling an engagement condition of the second frictional engagement element so that the rotation speed difference of the second frictional engagement element reaches the second target difference revolution speed; changing the rotation speed of the input side of the second frictional engagement element gradually, and a termination phase step of: after the inertia phase step, controlling the engagement condition of the second frictional engagement element so that the rotation speed difference of the second frictional engagement element is maintained at the second target difference revolution speed.

The other objects and features of this invention will become understood from the following description with reference to the accompanying drawings.

DETAILED DESCRIPTION OF THE INVENTION

A first embodiment of the present invention will be explained below with reference to drawings.

[Common Configuration of Shift Control of Automatic Transmission between the Following Embodiments]

Firstly, the principles and common configuration of a shift control of an automatic transmission between the following embodiments will be explained with reference to FIGS. 1 to 5, before an explanation of each embodiment.

Figure 2:
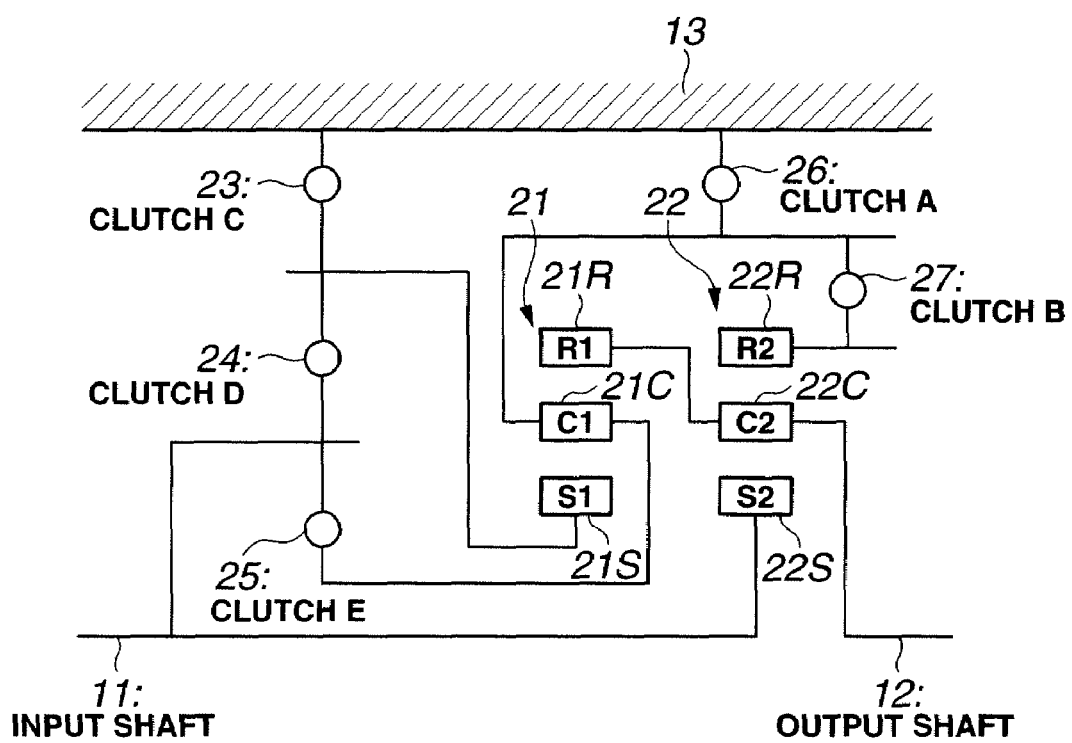
FIG. 2 is a schematic system diagram showing an example of a configuration of main body of the automatic transmission.

FIG. 2 is a schematic system diagram illustrating a configuration of a normal four-speed automatic transmission. The automatic transmission is installed between an input shaft 11 and an output shaft 12, and has two set of planetary gears 21 and 22 in series.

As can be seen in FIG. 2, between a sun gear (S1) 21S of the first planetary gear 21 and a casing 13, a brake (clutch C) 23 as a frictional engagement element is installed, then sun gear (S1) 21S stops rotating by engagement of this brake 23. On the other hand, between input shaft 11 and sun gear (S1) 21S, a clutch (clutch D) 24 as the frictional engagement element is installed, and sun gear (S1) 21S rotates integrally with the input shaft 11 by engagement of this clutch 24. In the following, the frictional engagement element such as the clutch and brake is simply called clutch.

Between input shaft 11 and a carrier (C1) 21C that carries planetary pinions of the first planetary gear 21, a clutch (clutch E) 25 is installed, and carrier (C1) 21C rotates integrally with the input shaft 11 by engagement of this clutch 25. On the other hand, between casing 13 and carrier (C1) 21C, a brake (clutch A) 26 as the clutch is installed, then the carrier (C1) 21C stops rotating by engagement of this brake 26. Further, between carrier (C1) 21C and a ring gear (R2) 22R of the second planetary gear 22, a clutch (clutch B) 27 is installed, and the carrier (C1) 21C rotates integrally with the ring gear (R2) 22R of the second planetary gear 22 by engagement of this clutch 27.

A ring gear (R1) 21R of the first planetary gear 21 is directly connected to a carrier (C2) 22C that carries planetary pinions of the second planetary gear 22. A sun gear (S2) 22S of the second planetary gear 22 is directly connected to input shaft 11. Further, carrier (C2) 22C carrying the planetary pinions of the second planetary gear 22 is directly connected to output shaft 12 while directly connecting to the ring gear (R1) 21R of the first planetary gear 21. As described above, ring gear (R2) 22R of the second planetary gear 22 is connected to the carrier (C1) 21C of first planetary gear 21 through the clutch 27.

Figures 3, 4:
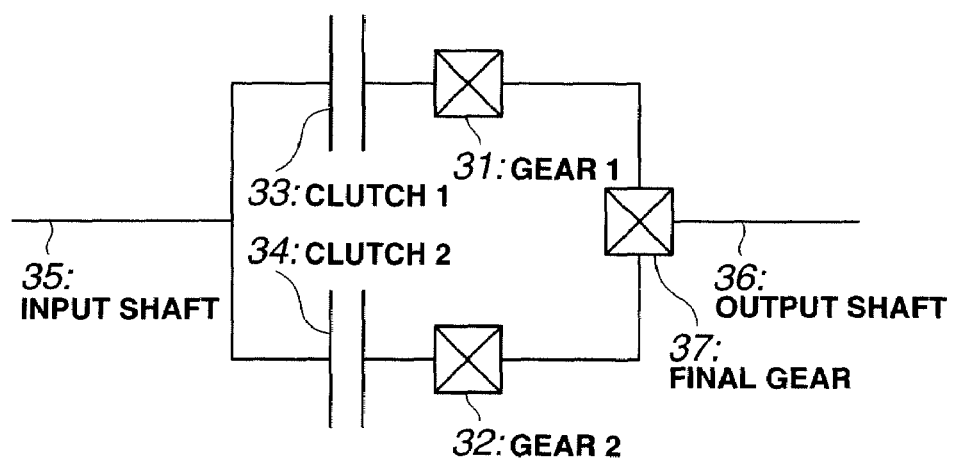
FIG. 3 is a table showing an engagement state of each frictional engagement element in a case of a down-shift from $2^{nd}$ speed to $1^{st}$ speed (down-shift of $2^{nd} \rightarrow 1^{st}$) in the automatic transmission as shown in FIG. 2.
FIG. 4 is a simplified diagram showing a basic configuration of the automatic transmission.

As shown in the table of the clutch engagement in FIG. 3, in a case of a down-shift from $2^{nd}$ speed to $1^{st}$ speed (down-shift of $2^{nd} \to 1^{st}$, a higher speed gear stage→a lower speed gear stage) by the above automatic transmission, clutch C is changed from an engaged condition to a disengaged (release) condition, and also clutch A is changed from the disengaged condition to the engaged condition, while the other clutches maintain their respective conditions before the down-shift. That is, by engaging the clutch A that is in the disengaged condition while releasing the clutch C that is in the engaged condition, the down-shift of $2^{nd} \to 1^{st}$ is carried out.

To simply understand this changeover between the clutches, the configuration of the automatic transmission can be simplified, that is, it can be illustrated in FIG. 4 as a parallel shaft type automatic transmission that has two gears, each of which has a certain transmission ratio and is connected with a clutch. More specifically, a clutch 33 connected in series with a gear (gear train) 31 having a certain transmission ratio (for instance, $2^{nd}$ speed) and a clutch 34 connected in series with a gear (gear train) 32 having a different transmission ratio (for instance, $1^{st}$ speed) are connected in parallel with each other. And each one side (each input side) of engagement elements of the clutches 33, 34 is connected to an input shaft 35. Further, the other sides (output sides) of engagement elements of the clutches 33, 34 are connected to an output shaft 36 through respectively the gear trains 31, 32 and also through a final gear 37.

Figure 5:
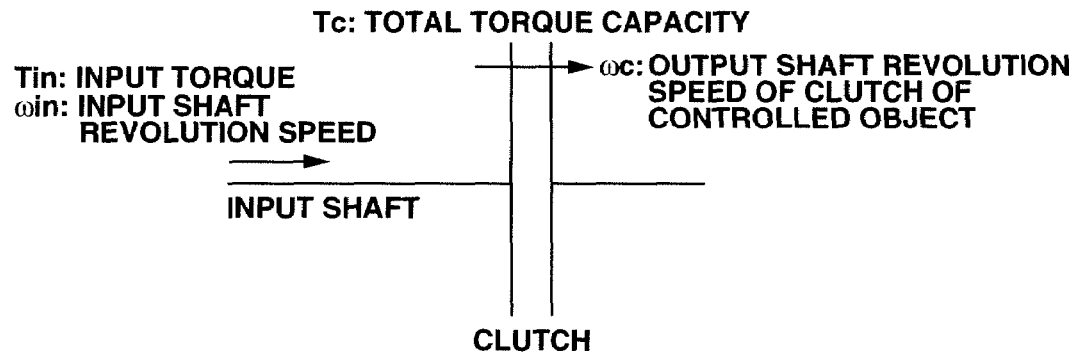
FIG. 5 is a further simplified diagram showing a basic configuration of the automatic transmission.

In this two-speed transmission as shown in FIG. 4, the above down-shift of $2^{nd} \to 1^{st}$ then corresponds to an execution of the shift control, which engages the clutch 34 that is in the disengaged condition while releasing the clutch 33 that is in the engaged condition. With respect to the changeover between clutches 33, 34, when considering this configuration from a viewpoint of a control of difference in rotation of clutches 33, 34, two clutch engagement capacities Tc1 and Tc2 are controlled and the difference in rotation of the either clutch is controlled in response to an input torque $T_{in}$ and an input rotation $\omega_{in}$. Thus, when considering only the clutch sections with the clutch sections drawn from this two-speed transmission, as illustrated in FIG. 5, the two clutches are not controlled individually, instead, the difference rotation control by a capacity control of one unified clutch is carried out, and the capacity control of the both clutches is executed.

Figure 1:
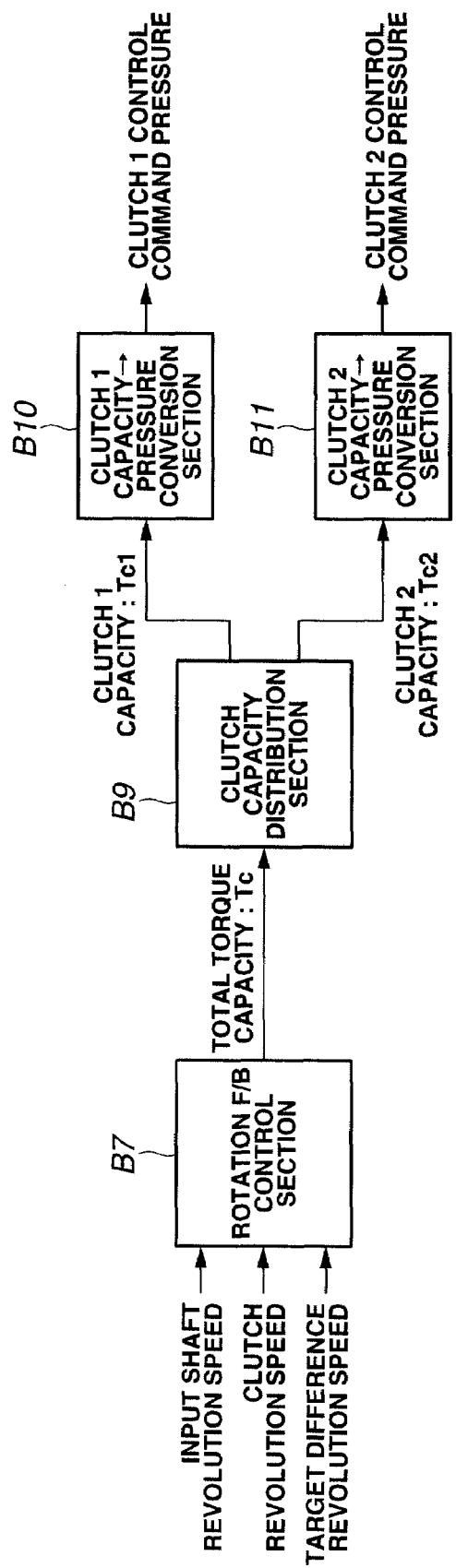
FIG. 1 is a block diagram showing a basic configuration of a shift control apparatus for an automatic transmission according to a first embodiment of the present invention.

Accordingly, as an outline configuration of the shift control apparatus of the automatic transmission, as illustrated in FIG. 1, a functional element (a feedback control section of a rotation speed or the difference rotation) B7 for a rotation control (control of the rotation speed of the input side or the difference rotation) of the clutch is placed in a prior stage. Further, in a following stage, a functional element (a clutch capacity distribution section) B9 for a distribution ratio control of the clutch is placed. With this configuration, a total torque capacity of two clutches; a disengagement side clutch (hereinafter called clutch 1, which is a currently-engaged clutch and is going to be released at the down-shift) and an engagement side clutch (hereinafter called clutch 2, which is a currently-released clutch and is going to be engaged at the down-shift), is controlled so that the input shaft rotation speed to the transmission or the difference rotation (difference in rotation) between input and output of the disengagement side clutch 1 is within a predetermined range. Further, the distribution ratio at the time of the distribution of the total torque capacity to the two clutches is changed while controlling the total torque capacity of two clutches in the above way, and thereby realizing the control of change of transmission torque share while executing the difference rotation control of the clutch. In this configuration, in the final stage, the transmission torque capacity of the disengagement side clutch 1 is converted to a control pressure at a conversion section B10, and the transmission torque capacity of the engagement side clutch 2 is converted to a control pressure at a conversion section B11, then a control command is carried out.

By the above configuration of the control system, although the control of the difference rotation of the clutch and the control of the distribution ratio of the torque are executed separately from each other, yet an integrated or merged control variable of these two is finally generated, and the control can be carried out by this integrated control variable. It is therefore possible to easily apply this shift control to the shift control of a variety of automatic transmissions. In addition, since the shift control can be carried out by only controlling an object to be controlled (the clutches of the changeover), a target value for the rotation control (the target value for the difference rotation between input and output shafts of the disengagement side clutch and the target value for the difference rotation between input and output shafts of the engagement side clutch, or the input shaft rotation speed) and the distribution ratio of the transmission torque between the disengagement side and engagement side clutches, the control system can readily be formed. Furthermore, such control method can readily be applied to the variety of automatic transmissions, and a smoother and more stable shift control can be realized without the shock.

First Embodiment

A shift control apparatus and controlling method for the automatic transmission according to the first embodiment will be explained below with reference to FIGS. 6 to 11.

(Automatic Transmission Configuration)

The configuration of the automatic transmission according to this embodiment will be explained first.

Figure 7:
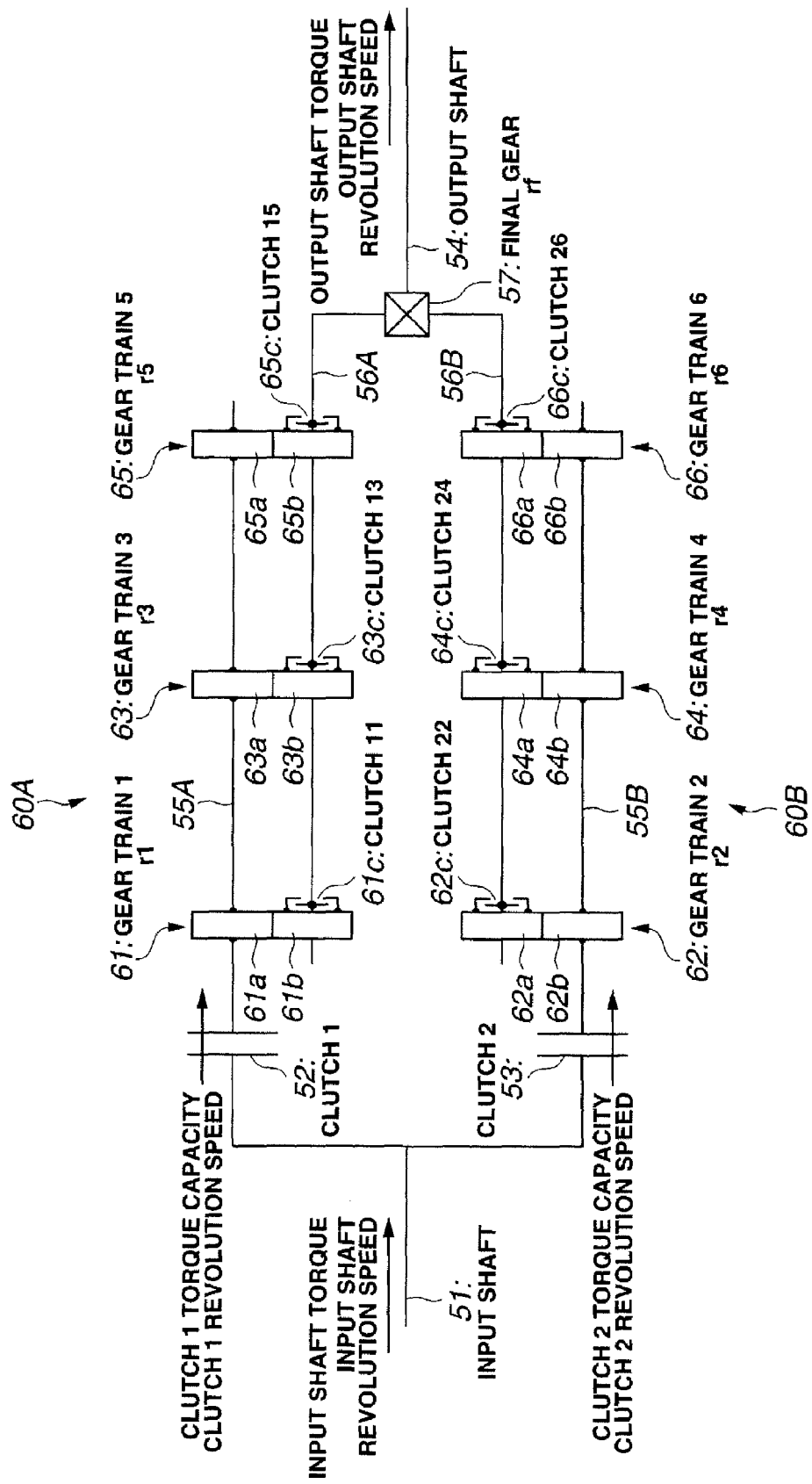
FIG. 7 is a schematic system diagram showing a configuration of the automatic transmission, which can be applied to the shift control of the present invention.

As illustrated in FIG. 7, the automatic transmission has an input shaft 51, first and second clutches (respectively, clutch 1 and clutch 2) 52 and 53 whose input side members are connected to input shaft 51, an output shaft 54, a shift gear mechanism 60A installed between first clutch 52 and output shaft 54, and a shift gear mechanism 60B installed between second clutch 53 and output shaft 54.

The shift gear mechanism 60A has an input side shaft (input shaft 1) 55A, an output side shaft (output shaft 1) 56A, and the following three speed gear sets that are installed between the input side and output side shafts 55A, 56A; a first speed gear set 61 employing gears 61a, 61b and a synchronized engaging mechanism (also simply called synchro-mechanism) 61c, a third speed gear set 63 employing gears 63a, 63b and a synchronized engaging mechanism 63c, and a fifth speed gear set 65 employing gears 65a, 65b and a synchronized engaging mechanism 65c.

The shift gear mechanism 60B has an input side shaft (input shaft 1) 55B, an output side shaft (output shaft 1) 56B, and the following three speed gear sets that are installed between the input side and output side shafts 55B, 56B; a second speed gear set 62 employing gears 62a, 62b and a synchronized engaging mechanism 62c, a fourth speed gear set 64 employing gears 64a, 64b and a synchronized engaging mechanism 64c, and a sixth speed gear set 66 employing gears 66a, 66b and a synchronized engaging mechanism 66c.

Further, each output end of the output side shafts 56A, 56B is connected to output shaft 54 through a final gear 57. A rotation of the output side shaft 56A and a rotation of the output side shaft 56B, then, are changed to the respective rotation speeds according to a gear ratio of final gear 57, and are transferred or transmitted to output shaft 54.

As can be seen in FIG. 7, to achieve $1^{st}$ speed or $3^{rd}$ speed or $5^{th}$ speed, only the engaging mechanism 61c or 63c or 65c of the speed gear set to be achieved is engaged, and first clutch 52 is engaged and also second clutch 53 is released. On the other hand, to achieve $2^{nd}$ speed or $4^{th}$ speed or $6^{th}$ speed, only the engaging mechanism 62c or 64c or 66c of the speed gear set to be achieved is engaged, and second clutch 53 is engaged and also first clutch 52 is released.

[Functional Configuration of Shift Control]

In this embodiment, the shift control of the down-shift is applied to the above changeover in which one clutch of the first and second clutches 52 and 53 required for the changeover at the shift is changed from the engaged condition to the disengaged condition and the other clutch is changed from the disengaged condition to the engaged condition. Here, for the sake of convenience, the first clutch 52 is the clutch 1 that is changed from the engaged condition to the disengaged condition, and the second clutch 53 is the clutch 2 that is changed from the disengaged condition to the engaged condition (for example, down-shift of $3^{rd} \rightarrow 2^{nd}$). However, needless to say, it is possible for the execution of this shift control that the first clutch 52 is changed from the disengaged condition to the engaged condition and the second clutch 53 is changed from engaged condition to the disengaged condition (for example, down-shift of $2^{nd} \rightarrow 1^{st}$).

The shift control apparatus of the present invention includes the basic configuration shown in FIG. 1, in more detail, the shift control apparatus has the following shift control phases; a changeover phase that has been described above, a preliminary phase where the preliminaries to the changeover is carried out in a prior stage of the changeover phase, an inertia phase (inertia control phase) where a quantity of inertia is controlled after the changeover phase, and a termination or completion phase where the control proceeds to the end after the inertia phase.

Figure 6:
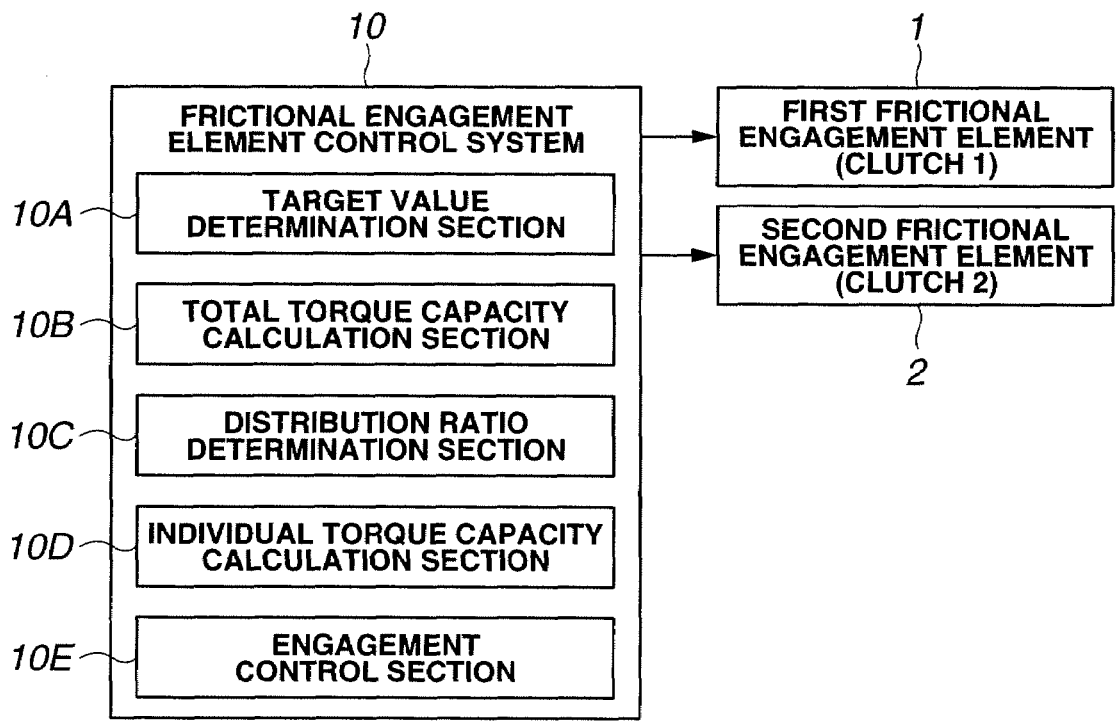
FIG. 6 is a control block diagram showing a configuration of a main section of the shift control apparatus of the automatic transmission.

Further, control function or system (a frictional engagement element control system or means) 10 of this control apparatus has, as shown in FIG. 6, a target value determination section or means 10A, a total torque capacity calculation section or means 10B, a distribution ratio determination section or means 10C, an individual torque capacity calculation section or means 10D, and an engagement control section or means 10E. These each sections 10A~10E are provided in a shift control ECU (electronic control unit) as functional elements.

Target value determination section 10A sets or determines a first target difference revolution speed (also called a target difference rotation 1) $\Delta n1$ that is a before-speed-gear-change target value of the input shaft rotation speed of the transmission (here, this corresponds to a target difference revolution speed that is a target of a difference in rotation speed between input and output sides of the disengagement side clutch before the change of the speed gear), and a second target difference revolution speed (also called a target difference rotation 2) $\Delta n2$ that is an after-speed-gear-change target value of the input shaft rotation speed of the transmission (here, this corresponds to a target difference revolution speed that is a target of a difference in rotation speed between input and output sides of the engagement side clutch after the change of the speed gear).

Concerning the down-shift in a power-off condition, the first target difference revolution speed $\Delta n1$ is determined so that the input rotation speed of the disengagement side clutch becomes lower than the output rotation speed (rotation speed according to the vehicle speed under the transmission ratio before the shift). Then by providing a slide or slip to the disengagement side clutch, an engine rotation speed (the input side rotation speed) is lowered, and the difference rotation of the disengagement side clutch becomes close to the first target difference revolution speed $\Delta n1$. On the other hand, as for the second target difference revolution speed $\Delta n2$, it is determined so that the input rotation speed of the engagement side clutch becomes lower than the output rotation speed (rotation speed according to the vehicle speed under the transmission ratio after the shift). This expedites the torque transmission (or torque transfer) from output side to input side of the engagement side clutch in the process of engagement of the engagement side clutch, and the decrease of the output torque is expedited (the increase in reduction torque is expedited).

Furthermore, on condition that the vehicle travels in the power-off condition, target value determination section 10A determines the target difference revolution speed for a currently-used (engaged) clutch (the clutch that is going to be released at the next shift) even at the steady vehicle travel before determining the execution of the shift (shift determination). In this case, this target difference revolution speed uses the first target difference revolution speed $\Delta n1$. That is to say, during the vehicle travel in the power-off condition, even in the case where the execution of the shift is not determined yet, the target difference revolution speed is determined and the currently-engaged clutch is provided with the slip according to this target difference revolution speed. This can allow a smooth process or changeover in the following changeover phase.

In addition, with respect to the currently-released clutch, it is dragged in rotation direction and is rotated with the currently-released clutch in a not-yet engaged condition. By dragging and rotating the currently-released clutch while providing the slip to the currently-engaged clutch, it is possible, in advance, to lessen the change of revolution speed which is provided to the currently-released clutch after the initiation of the shift. This can therefore shorten the time required for the shift and also improve the durability of the currently-released clutch.

Total torque capacity calculation section 10B calculates the total transmission torque capacity from parameter values according to an engine load such as a throttle opening and an accelerator opening. Thus, for example, in the changeover phase, when considering that the total transmission torque capacity itself, transmitted by the each clutch, corresponds to the engine load, by executing the control so that this total transmission torque capacity is transmitted by the transmission, the input shaft rotation speed can be maintained in a constant condition.

Here, in the case where the engine generates the torque, namely in the case of the power-on condition, if the total transmission torque capacity is small for the engine load, the engine rotation speed (i.e. the input shaft rotation speed) is increased. Conversely, if the total transmission torque capacity is great for the engine load, the engine rotation speed (i.e. the input shaft rotation speed) is lowered. On the other hand, in a case of the power-off condition such as during engine brake, by a rotational torque from drive wheels, the engine is driven and rotated. Thus, if the total transmission torque capacity is small for the engine load, the engine rotation speed (i.e. the input shaft rotation speed) is lowered. Conversely, if the total transmission torque capacity is great for the engine load, the engine rotation speed (i.e. the input shaft rotation speed) is increased.

Distribution ratio determination section 10C sets or determines the share rate (the distribution ratio) of the disengagement side and engagement side clutches in response to the total transmission torque capacity.

At the shift, in the preliminary phase, distribution ratio determination section 10C sets the distribution ratio of the disengagement side clutch to 1 so that the disengagement side clutch receives or takes all the total transmission torque capacity. At this time, the transmission torque capacity of the disengagement side clutch is substantially equal to the input torque to the transmission. In the changeover phase, the respective distribution ratios are set so that the distribution ratio of the disengagement side clutch is diminished or lowered from 1 to 0, while the distribution ratio of the engagement side clutch is increased from 0 to 1. With this, the interlock phenomenon caused by engagement of both the clutches and an engine racing (engine RPM surge) can be prevented. Further, in the inertia phase and termination phase, distribution ratio determination section 10C sets the distribution ratio of the engagement side clutch to 1 (or conversely, sets the distribution ratio of the disengagement side clutch to 0) so that the engagement side clutch receives or takes all the total transmission torque capacity. With this, in the inertia phase, a rotation change (inertia phase) can occur by changing the target value without changing a control logic itself.

Individual torque capacity calculation section 10D sets or determines the respective torque capacities (the respective individual torque capacities) of the disengagement side and engagement side clutches from the total torque capacity that is calculated by the total torque capacity calculation section 10B and the each distribution ratio of the disengagement side and engagement side clutches which is set by the distribution ratio determination section 10C. That is, by multiplying the total torque capacity by the distribution ratio of the disengagement side clutch, the individual torque capacity of the disengagement side clutch is obtained. Likewise, by multiplying the total torque capacity by the distribution ratio of the engagement side clutch, the individual torque capacity of the engagement side clutch is obtained.

Engagement control section 10E controls each engagement control amount or value of the disengagement side and engagement side clutches on the basis of the transmission torque capacity (the individual torque capacity) calculated by the individual torque capacity calculation section 10D, before initiation of the down-shift. Here, as the engagement control amount, each oil pressure applied to the each clutch is used. However, since there is a relationship (clutch capacity-oil pressure conversion relationship or characteristic) between the individual torque capacity and its corresponding clutch oil pressure, the oil pressure of the clutch is set from the individual torque capacity, and the control is carried out. Regarding the clutch capacity-oil pressure conversion characteristic, it is preferable to use a friction resistance characteristic of the difference revolution speed of the input and output of the each clutch. Or, to obtain the appropriate clutch capacity-oil pressure conversion characteristic, it might be preferable to execute a learning control by using a torque correction amount (F/B correction amount) (described later) for this conversion characteristic. By using the clutch capacity-oil pressure conversion relationship, the changeover of the clutches, carried out by hydraulic pressure, can be executed by a simple control logic.

In the shift control of the transmission, at the steady vehicle travel before the initiation of the shift, on condition that the vehicle travels in the power-off condition, the target difference revolution speed control for the currently-engaged clutch (the clutch that is going to be released at the next shift) is executed, and also the currently-released (or waiting) clutch is dragged in rotation direction and is rotated under the not-yet engaged condition in order to lessen, in advance, the revolution speed change that occurs to this clutch after the initiation of the shift. With this, it is possible to shorten the time required for the shift and also improve the durability of the currently-released clutch.

Upon determination of initiation of the shift, the shift control (the preliminary phase, the changeover phase, the inertia phase, and the termination phase) is initiated.

In the preliminary phase, the engagement control amount of the disengagement side clutch is controlled so that the disengagement side clutch is in the slipping or sliding-engaged condition and its input-output difference revolution speed (difference in revolution speed or rotation speed between input and output of the disengagement side clutch) becomes the first target difference revolution speed $\Delta n1$ from the time of initiation of the shift. At this time, as a matter of course, the engagement side clutch that is going to be engaged after the shift is in the disengaged condition, this means that the disengagement side clutch takes all the total transmission torque capacity of the transmission (in other words, the distribution ratio of the disengagement side clutch is 1). Further, in this preliminary phase, in a case where a mechanical operation except the engagement and release of the clutch is required for changing the configuration of the engagement side gear train, this change of configuration of the engagement side gear train is carried out so as to execute the following changeover phase smoothly. Therefore, even if the difference revolution speed of the disengagement side clutch reaches the first target difference revolution speed $\Delta n1$, unless this change of configuration of the engagement side gear train is completed, the difference revolution speed of the disengagement side clutch is held or maintained at the first target difference revolution speed $\Delta n1$.

In the changeover phase, total torque capacity calculation section 10B calculates the total transmission torque capacity needed to maintain the difference revolution speed of the disengagement side clutch at the first target difference revolution speed $\Delta n1$. In addition, distribution ratio determination section 10C determines the distribution ratio of the transmission torque between the disengagement side and engagement side clutches so that the sum of the each transmission torque capacity of the disengagement side and engagement side clutches becomes equal to the above total transmission torque capacity and also the distribution ratio of the disengagement side clutch is diminished while the distribution ratio of the engagement side clutch is increased. Then, on the basis of the calculated total transmission torque capacity and the determined distribution ratio, the each transmission torque capacity of the disengagement side and engagement side clutches is determined. Further, on the basis of this determined transmission torque capacity, the each engagement control amount of the disengagement side and engagement side clutches is controlled.

In the inertia phase, the engagement control amount of the engagement side clutch is controlled while maintaining the slipping-engaged condition of the disengagement side clutch so that the difference revolution speed of the engagement side clutch becomes close to the second target difference revolution speed $\Delta n2$.

In the termination phase, a judgment is made as to whether a next another shift control is carried out shortly (a pre-shift judgment is made) while maintaining the difference revolution speed of the engagement side clutch at the second target difference revolution speed $\Delta n2$. This pre-shift judgment is made based on the vehicle speed, throttle opening and speed gear (stage) at the time point of this pre-shift judgment. If the next another shift control is carried out shortly, the establishment of a predicted gear or predicted speed gear stage (the pre-shift) is judged to be necessary, and a command of this establishment of the predicted gear is set in order to shorten a shift operation time. Here, the establishment of the predicted gear means a completion of engagement of power train elements (for example, a gear setting of a target speed gear) required for attaining the target speed gear at the next another shift, namely that it means the completion of the mechanical operation, and it is also called the pre-shift. This establishment of the predicted gear is executed after the power train element of a before-shift speed gear (i.e. a disengagement side speed gear that was being used until this shift) is released, in order to prevent the interlock between the power train element associated with this establishment of the predicted gear and the power train element of the before-shift speed gear. If the next another shift control is not carried out shortly, the drag rotation control of the disengagement side clutch is executed (the disengagement side clutch is controlled to be dragged in rotation direction and is rotated). In this termination phase, with respect to the engagement side clutch, it is controlled so that the difference revolution speed is maintained at the second target difference revolution speed $\Delta n2$, and a condition is maintained where the engagement side clutch takes all the total transmission torque capacity (in other words, the distribution ratio of the engagement side clutch is 1).

Here, regarding shift from the above-described certain phase to the next phase, to initiate and execute each the phase smoothly, it is made upon satisfaction of the following conditions.

The shift from the preliminary phase to the changeover phase is made on condition that the difference revolution speed of the disengagement side clutch reaches the first target difference revolution speed $\Delta n1$ and also the change of the configuration of the engagement side gear train is completed in the case where the mechanical operation except the engagement and release of the clutch is required.

The shift from the changeover phase to the inertia phase is made on condition that the transmission torque capacity of the disengagement side clutch becomes 0 by the changeover phase.

The shift from the inertia phase to the termination phase is made on condition that the following either condition is satisfied; the difference revolution speed of the engagement side clutch is within a predetermined range of the second target difference revolution speed $\Delta n2$, or a timer, which starts counting at the point of initiation of the inertia phase, reaches a predetermined time.

The termination phase ends on condition that the predicted gear is established in the case where the next another shift control is carried out shortly. On the other hand, in the case where the next another shift control is not carried out shortly, the termination phase ends on condition that the drag rotation control of the disengagement side clutch is being executed and also the difference revolution speed of the engagement side clutch is within the predetermined range of the second target difference revolution speed $\Delta n2$ (and is maintained within this predetermined range for only a specified time which is determined by the load of the engine or a certain amount corresponding to the load, and the rotation of an input member of the transmission or a certain amount corresponding to the rotation or the transmission ratio, at the time point).

With respect to the target difference revolution speeds $\Delta n1$ and $\Delta n2$ associated with a threshold value of the phase shift, they are constant values, but they could be set based on an engine load condition at the point of initiation of the shift control or at the point when the phase initiates, that is, based on the load of the engine or the certain amount corresponding to the load (for instance, throttle opening, engine torque, etc.) at the above initiation point. Furthermore, they might be set variably according to the engine load condition and the input rotation speed at the point when the preliminary phase initiates (for example, as the engine load becomes greater and the input rotation speed becomes higher, the target difference revolution speeds are set to be greater.). With this setting, the target difference revolution speeds appropriate to vehicle traveling (or operating) condition can be set.

(Control Block Diagram)

Figure 8:
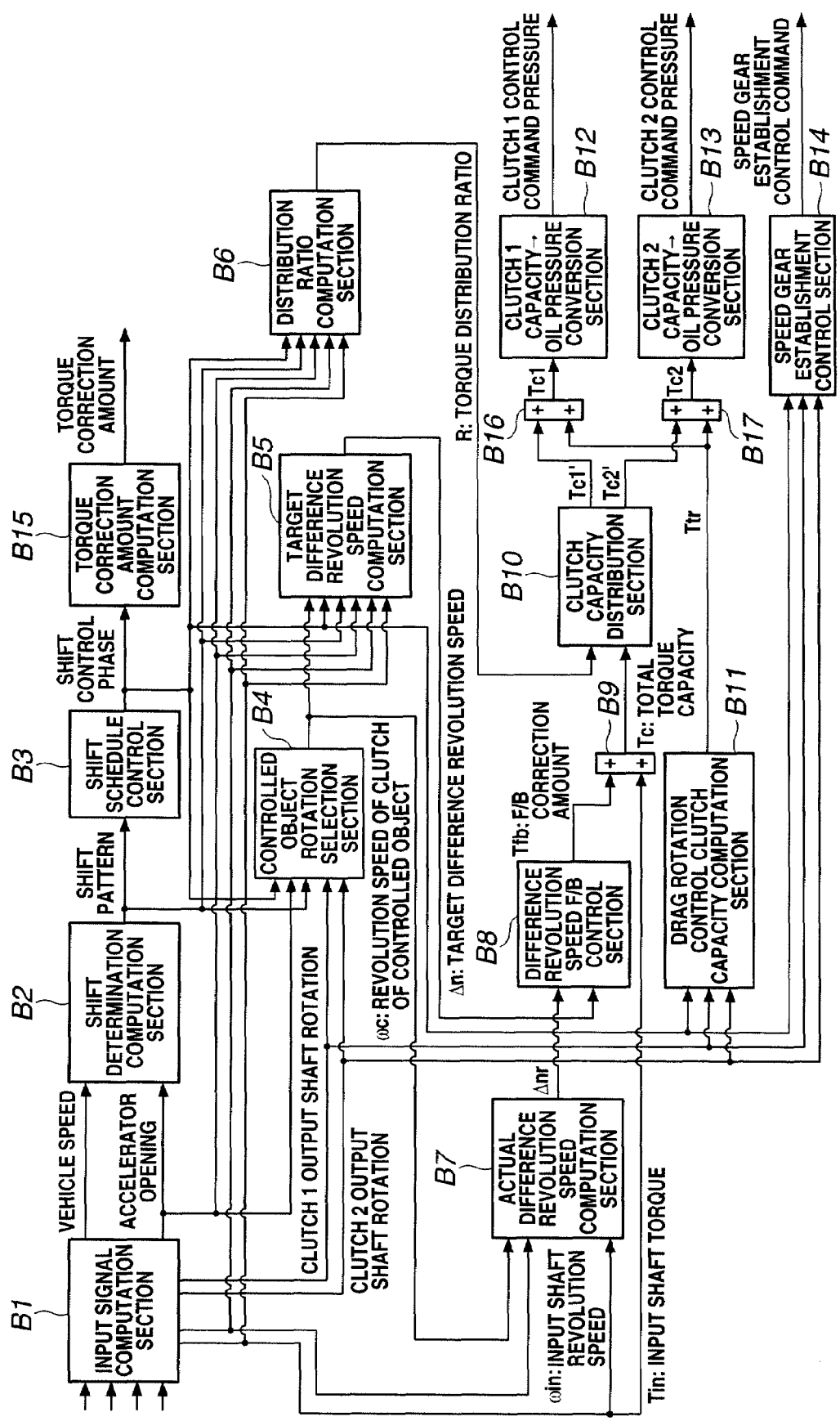
FIG. 8 is a control block diagram showing a detailed configuration of the control of the shift control apparatus.

Next, the control configuration of the shift control apparatus will be explained with reference to FIG. 8. As seen in FIG. 8, as a matter of course, the shift control apparatus includes the components shown in FIG. 1 as control functional elements. More specifically, the shift control apparatus has an input signal computation section B1, a shift determination computation section B2, a shift schedule control section B3, a controlled object rotation selection section B4, a target difference rotation computation section (a target difference revolution speed computation section) B5, a distribution ratio computation section B6, an actual difference revolution speed computation section B7, a rotation F/B control section (a rotation speed feedback control section, or a difference revolution speed F/B control section) B8, an addition section B9, a clutch capacity distribution section (a torque capacity distribution section) B10, a drag rotation control clutch capacity computation section B11, a clutch 1 capacity/oil pressure conversion section B12, a clutch 2 capacity/oil pressure conversion section B13, a speed gear (or speed gear stage) establishment control section B14, a torque correction amount computation section B15, and another addition sections B16, B17.

In FIG. 8, target difference rotation computation section B5 corresponds to target value determination section 10A in FIG. 6, distribution ratio computation section B6 corresponds to distribution ratio determination section 10C. Further, addition section B9 corresponds to total torque capacity calculation section 10B, torque capacity distribution section B10 and addition sections B16, B17 correspond to individual torque capacity calculation section 10D, and both of the clutch 1 capacity/oil pressure conversion section B12 and clutch 2 capacity/oil pressure conversion section B13 correspond to engagement control section 10E.

Firstly, input signal computation section B1 receives and computes the input signals. This input signals include a wheel speed signal for generating a vehicle speed signal, an accelerator opening signal for generating an acceleration control input or amount signal, an input shaft signal that is the input side rotation speeds of the clutches 1 and 2, a first output shaft signal that is the output side rotation speed of the clutch 1, and a second output shaft signal that is the output side rotation speed of the clutch 2, etc.

Shift determination computation section B2 receives the vehicle speed signal and the acceleration control amount signal from input signal computation section B1, and generates a shift pattern by comparing with a preset shift map. This shift pattern includes also non-shift condition.

Shift schedule control section B3 watches or checks this shift pattern, an output side rotation speed $\omega_C$ of clutch of the controlled object, and a torque capacity distribution ratio "R" of the both clutches, and thereby judges the progress of the shift control. Shift schedule control section B3, then, selects one phase from the preliminary phase, the changeover phase, the inertia phase and the termination phase by this judgment, and generates a shift control phase.

Controlled object rotation selection section B4 selects the clutch that becomes the controlled object from the shift pattern generated by shift determination computation section B2 and the shift control phase generated by shift schedule control section B3, and generates the output side rotation speed $\omega_C$ of the clutch of the controlled object from the output rotation speed signal of the selected clutch.

Target difference rotation computation section B5 generates a target difference revolution speed $\Delta n$ ($\Delta n1$ or $\Delta n2$) from the shift control phase generated by shift schedule control section B3 and the output side rotation speed $\omega_C$ of the clutch of the controlled object. At this time, in a case where a sign of the input shaft torque $T_{in}$ is plus, the target difference revolution speed $\Delta n$ is set so that the input side rotation speed (the input shaft revolution speed) $\omega_{in}$ of the clutch of the controlled object becomes greater than the output side rotation speed $\omega_C$. On the other hand, in a case of minus, the target difference revolution speed $\Delta n$ is set so that the input side rotation speed $\omega_{in}$ of the clutch of the controlled object becomes smaller than the output side rotation speed $\omega_C$. Hence, under the power-off condition, the target difference revolution speed $\Delta n$ is set so that the output side rotation speed of the clutch of the controlled object becomes greater than the input side rotation speed.

Distribution ratio computation section B6 generates the torque capacity distribution ratio "R" of the clutch from the shift control phase.

Actual difference revolution speed computation section B7 computes or calculates an actual difference revolution speed $\Delta nr$ of the clutch revolution speed of the clutch of the controlled object and the input shaft revolution speed. Here, when calculating the actual difference revolution speed $\Delta nr$, it does in consideration of the positive (plus) and negative (minus) signs of the input shaft torque.

Rotation F/B control section B8 generates a feedback control amount (F/B correction amount or the torque correction amount) Tfb for the target difference rotation by using a deviation or difference between the actual difference revolution speed $\Delta nr$ of the clutch of the controlled object and the target difference revolution speed $\Delta n$.

Addition section B9 generates a total torque capacity Tc of the clutch by adding the F/B correction amount Tfb generated by rotation F/B control section B8 to the input shaft torque $T_{in}$ corresponding to an amount of an open control. With this, the required total torque capacity Tc can be calculated accurately.

Torque capacity distribution section B10 distributes the total torque capacity Tc calculated by addition section B9 to the each clutch in accordance with the torque capacity distribution ratio "R" generated by distribution ratio computation section B6. Here, the torque capacities distributed to the clutches 1, 2 are respectively a clutch 1 capacity Tc1' and a clutch 2 capacity Tc2'.

Drag rotation control clutch capacity computation section B11 calculates a torque capacity Ttr needed for the drag rotation control of a non-drive side clutch (non-drive side shaft). Here, in the case where the pre-shift is judged, this torque capacity Ttr is set to 0.

Addition section B16 generates the torque capacity Tc1 of the clutch 1 by adding the torque capacity Ttr generated by drag rotation control clutch capacity computation section B11 to the clutch 1 capacity Tc1' generated by torque capacity distribution section B10.

Addition section B17 generates the torque capacity Tc2 of the clutch 2 by adding the torque capacity Ttr generated by drag rotation control clutch capacity computation section B11 to the clutch 2 capacity Tc2' generated by torque capacity distribution section B10.

Clutch 1 capacity/oil pressure conversion section B12 converts the torque capacity Tc1 to a clutch 1 control command pressure, while clutch 2 capacity/oil pressure conversion section B13 converts the torque capacity Tc2 to a clutch 2 control command pressure. The control of the each clutch is, then, carried out.

Speed gear establishment control section B14 outputs the command of the establishment of the speed gear in the case of the automatic transmission in which the speed gear is established by the mechanical operation except the engagement/release of the clutch, such as the changeover (the configuration change) of the gear train by the synchro-mechanism. However, in the case of the automatic transmission that does not require this mechanical operation, this is omitted.

Torque correction amount computation section B15 calculates a generated inertia torque from a changing speed (a differential value) of the target difference revolution speed at the inertia phase. In more detail, torque correction amount computation section B15 calculates the time differential value of the set target difference revolution speed, and calculates the torque correction amount by multiplying the time differential value by an input shaft inertia, and further makes a request to the engine for the torque correction according to this torque correction amount. With this torque correction request, the generated inertia torque at the time of rotation change can be canceled. Further, in a case where the torque correction request to the engine is excessive in the inertia phase, this excessive torque correction amount is added to the torque capacities of the clutches 1, 2, and the clutches 1, 2 are slightly interlocked. With this, even in a case where the generated inertia torque can not be canceled by only the engine, the inertia torque can be canceled by using friction loss.

(Flow Chart)

Figure 9:
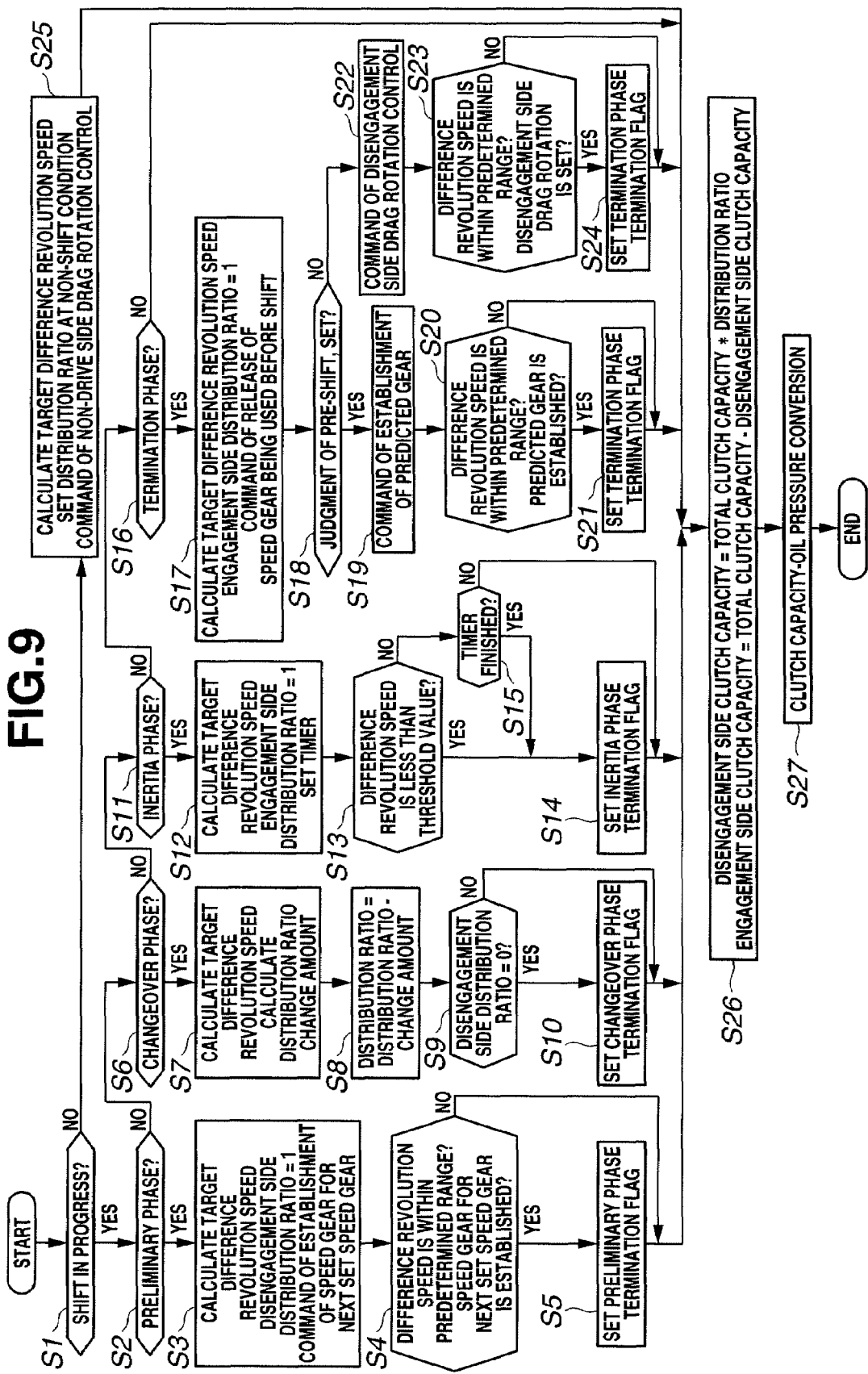
FIG. 9 is a time chart explaining an example of the shift control of the automatic transmission.

The shift control apparatus of the automatic transmission is configured as described above, and the shift control at the power-off down-shift is executed along a flow chart illustrated in FIG. 9.

As seen in FIG. 9, first, at step S1, a judgment is made as to whether or not the shift control is in progress. If yes (the shift control is in progress), the routine proceeds to step S2.

At step S2, a judgment is made as to whether or not the current phase is the preliminary phase. Here, if the current point is the shift initiation point, the preliminary phase is selected, and the routine proceeds to step S3.

In the preliminary phase, at step S3, the target value of the difference rotation control for the input rotation is set to the target difference revolution speed $\Delta n1$ that is a before-shift control target value (before-shift target difference revolution speed). With respect to the before-shift control target value, in the case of the up-shift, it is set to be higher (greater) than the rotation speed at the initiation of the shift control, while in the case of a downshift, it is set to be lower (smaller) than the rotation speed at the initiation of the shift control. However, when considering the case of the power-off down-shift during the vehicle travel, the before-shift control target value is set to be lower than the rotation speed at the initiation of the shift control. At the same time, at step S3, the distribution ratio of the disengagement side clutch is fixed to 1, while the distribution ratio of the engagement side clutch is fixed to 0.

Further, command of establishment of the next set speed gear associated with the engagement side clutch is set. However, in a case where the speed gear is already established by the pre-shift at the preceding (or last) shift, this establishment command is not set. Conversely, in a case where the pre-shift is not carried out and the drag rotation control is being executed at the preceding shift, the torque capacity Ttr needed for the drag rotation control is set to 0 at the same time of this establishment command, then the engagement side clutch is controlled to have or take a subminimal torque capacity needed for the torque transmission. With this, the drag rotation control is cancelled (or forbidden), and the establishment of the speed gear is carried out after ensuring no interlock.

Subsequently, at step S4, a judgment is made as to whether or not the actual rotation speed (the actual difference revolution speed) of the disengagement side clutch reaches a predetermined range that is close to the before-shift target difference rotation speed (the before-shift target difference revolution speed). In this embodiment, the mechanical changing operation of the speed gear by the synchro-mechanism is required on a driveline. Thus, in addition to the above judgment concerning the actual rotation speed of the disengagement side clutch, at this step S4, a judgment is made as to whether or not an engagement side speed gear is set to the next set speed gear by the mechanical operation. That is to say, at step S4, the above two judgments are made as an "and" condition.

Here, in the case where the engagement side speed gear is set to the next set speed gear by the pre-shift at the preceding shift, as a matter of course, this condition concerning the setting of the engagement side speed gear is satisfied.

At this step S4, if the judgment is NO, namely that if the actual rotation speed of the disengagement side clutch does not reach the before-shift target difference rotation speed, or if the setting of the engagement side speed gear for the next set speed gear by the mechanical operation is not completed yet, the routine proceeds to steps S26, S27, then computation processes of the clutch capacity and the clutch command oil pressure are executed. That is, at step S26, the disengagement side torque capacity and the engagement side torque capacity are calculated from both the total clutch capacity and the distribution ratio, calculated at this time point. Further, at step S27, on the basis of the each conversion relationship between the torque capacity and oil pressure, each command as the clutch command oil pressure is output to actuators.

As explained above, the preliminary phase is carried out such that the each process of the steps S1, S2, S3, S4, S5 (described later), S26 and S27 is repeated in a certain control cycle (or cycle period), and thus the actual difference revolution speed becomes within the predetermined range of the target difference revolution speed and is maintained within this predetermined range for only a specified time. And, also in the case of the automatic transmission that requires the configuration change of the engagement side gear train by the mechanical operation except the engagement/release of the clutch, by these steps, the setting of the engagement side speed gear is established for the next set speed gear by the mechanical operation. Here, with respect to the specified time, it is determined by the load of the engine or the certain amount corresponding to the load, and the rotation of the input member or the certain amount corresponding to the rotation or the transmission ratio, at the time point.

In this way, at step S4, the condition or state comes where the actual rotation speed of the disengagement side clutch is judged to reach the before-shift target difference rotation speed (and also, in the case of the automatic transmission that requires the configuration change of the engagement side gear train, the setting of the engagement side speed gear is judged to be established for the next set speed gear by the mechanical operation). In this case (the above condition comes), the routine proceeds to step S5, and a preliminary phase termination flag is set, then the preliminary phase is terminated and the phase shifts to the changeover phase. By this flag, by the next control cycle, at step S2, the judgment becomes NO, that is, the current phase is judged not to be the preliminary phase, the routine, then, proceeds to step S6.

At step S6, a judgment is made as to whether or not the current phase is the changeover phase, and if YES (the current phase is judged to be the changeover phase), the routine, then, proceeds to step S7.

At step S7, the target value of the difference rotation control is maintained at the before-shift target difference revolution speed $\Delta n1$. And also, at the same time, a distribution ratio variation or change amount (an amount per one control cycle) is set so that the distribution ratio of the disengagement side clutch is diminished at a predetermined change speed, while the distribution ratio of the engagement side clutch is increased at a predetermined change speed.

Subsequently, at step S8, by subtracting the distribution ratio change amount from a last distribution ratio, the distribution ratio of the disengagement side clutch is determined or set. In contrast, the distribution ratio of the engagement side clutch is determined by adding the distribution ratio change amount to the last distribution ratio.

Afterwards, at step S9, a judgment is made as to whether or not the distribution ratio of the disengagement side clutch is 0.

Here, the distribution ratio of the disengagement side clutch does not become 0 for a while after the initiation of the changeover phase. Thus, in this changeover phase also, the above-mentioned each process of steps S26, S27 is executed based on the determined distribution ratio. That is, the final disengagement side engagement capacity and engagement side engagement capacity are calculated (at step S26), and these engagement capacity are converted to the disengagement side and engagement side clutch command oil pressures (at step S27), then the each command is output to the actuators.

By repeating the process of the changeover phase in this way, the distribution ratio of the disengagement side clutch is diminished at steps S7, S8, and the judgment is made whether this distribution ratio is 0 at step S9. If the judgment is YES at step S9, namely that the distribution ratio is 0, the routine proceeds to step S10.

At step S10, the changeover phase is terminated, and a changeover phase termination flag is set and the phase shifts to the inertia phase. By this flag, by the next control cycle, at step S6 through step S2, the judgment becomes NO, that is, the current phase is judged not to be the changeover phase, the routine, then, proceeds to step S11.

At step S11, a judgment is made as to whether or not the current phase is the inertia phase, and if YES (the current phase is judged to be the inertia phase), the routine, then, proceeds to step S12.

At step S12, the target value of the difference rotation control is set to the target difference revolution speed $\Delta n2$ that is an after-shift control target value. And also, at the same time, the distribution ratio of the disengagement side clutch is set to 0, and the distribution ratio of the engagement side clutch is set to 1. In addition, the timer for counting the time of the inertia phase starts.

Subsequently, at step S13, a comparison between the target difference revolution speed and the current actual difference revolution speed of the engagement side clutch is made. Then a judgment is made as to whether or not the actual difference revolution speed reaches the predetermined range of the target difference revolution speed by comparing with the threshold value.

If the actual difference revolution speed does not reach the target difference revolution speed, at step S15, a judgment is made as to whether or not the timer reaches a finish time or value (the predetermined time). With respect to the finish value (the predetermined time), it is set on the basis of a time that the actual difference revolution speed requires to reach the predetermined range of the target difference revolution speed. More specifically, it is a specified value that is determined by the load of the engine or the certain amount corresponding to the load (for instance, throttle opening), the input torque to the transmission or a certain amount corresponding to the input torque, etc., and the input shaft revolution speed or the input shaft revolution speed of the clutch of the controlled object or the transmission ratio, at the time point. By this time setting appropriate to the shift condition, it is possible to strike a suitable balance between a limitation of the time of the inertia phase (to reduce or eliminate an excess or undesirable time with respect to the inertia phase) and the improvement of an engagement shock of the second frictional engagement element (the engagement side clutch).

At step S15, if the timer does not reach the finish value, the final disengagement side engagement capacity and engagement side engagement capacity are calculated (at step S26), and these engagement capacity are converted to the disengagement side and engagement side clutch command oil pressures (at step S27), then the each command is output to the actuators.

By repeating the control cycle in the inertia phase, on condition that actual difference revolution speed reaches the target difference revolution speed or the timer reaches the finish value (the predetermined time), the routine proceeds from step S13 to step S14, or from step S15 to step S14.

At step S14, the inertia phase is terminated, and an inertia phase termination flag is set and the phase shifts to the termination phase. By this flag, by the next control cycle, at step S6 through step S2, the current phase is judged not to be the changeover phase, and further the current phase is judged not to be the inertia phase at step S11, the routine, then, proceeds to step S16.

At step S16, a judgment is made as to whether or not the current phase is the termination phase, and if YES (the current phase is judged to be the termination phase), the routine, then, proceeds to step S17.

At step S17, the target difference revolution speed of the engagement side clutch is maintained at the second target difference revolution speed. And also, at the same time, the distribution ratio of the disengagement side clutch is fixed to 0, and the distribution ratio of the engagement side clutch is set to 1. In addition, a command of release of the speed gear, which was established by the mechanical operation before this shift and being used until this shift, is also output.

Subsequently, at step S18, a judgment is made as to whether or not the pre-shift is required, that is, whether or not the next another shift control is carried out shortly. If the next another shift control is carried out shortly, the pre-shift is judged to be necessary, while if the next another shift control is not carried out shortly, the pre-shift is judged to be unnecessary.

If the pre-shift is judged to be necessary, at step S19, the command of establishment of the predicted gear is set.

Subsequently, at step S20, a judgment is made as to whether or not the difference revolution speed is within the predetermined range and also the predicted gear is established. If NO (the above conditions are not satisfied), the termination phase is continued. On the other hand, if YES (the above conditions are satisfied), a termination phase termination flag is set at step S21, and the shift is terminated. Here, in the case where the pre-shift is carried out, the torque capacity Ttr needed for the drag rotation control is set to 0, and the disengagement side clutch is controlled to have or take the subminimal torque capacity needed for the torque transmission. With this, the interlock is prevented.

Returning to step S18, if the pre-shift is judged to be unnecessary, at step S22, a command of the disengagement side (disengagement side shaft or disengagement side clutch) drag rotation control is set.

Further, at a following step S23, a judgment is made as to whether or not the difference revolution speed is within the predetermined range and also the disengagement side drag rotation control is carried out. If NO (the conditions are not satisfied), the termination phase is continued, while if YES, the termination phase termination flag is set at step S24, and the shift is terminated.

In the termination phase also, the final disengagement side engagement capacity and engagement side engagement capacity are calculated (at step S26), and these engagement capacity are converted to the disengagement side and engagement side clutch command oil pressures (at step S27), then the each command is output to the actuators. When the termination phase termination flag is established at step S21 or S24, the shift is terminated. Furthermore, by the next control cycle, at step S1, the current state (condition) is judged not to be in progress of the shift (judged to be the steady vehicle travel). The routine, then, proceeds to step S25.

At step S25, the target difference revolution speed is calculated, and the distribution ratio at the non-shift condition is set, further the drag rotation control of the non-drive side shaft is executed.

As explained above, by repeating the above processes in the determined control cycle, the shift of the present invention is executed.

(Time Chart at Power-Off Down-Shift)

The shift control will be explained below with reference to time series behavior diagrams (time charts) at the power-off down-shift (at the power-off down-shift associated with the vehicle speed-down during release of an accelerator pedal), shown in FIGS. 10 and 11.

(In the Case of Non Pre-Shift)

Figure 10:
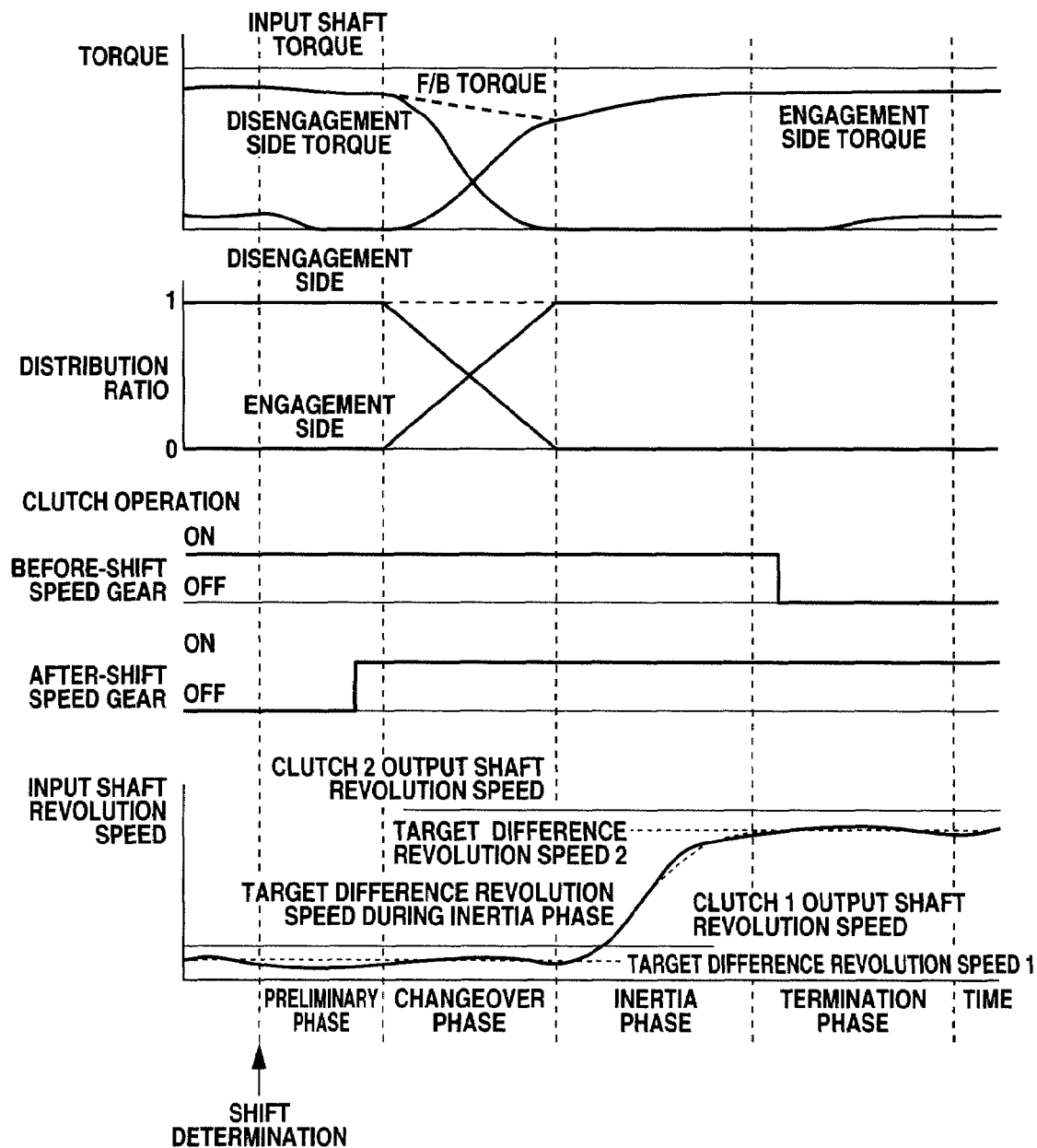
FIG. 10 is a flow chart explaining the shift control of the automatic transmission.

FIG. 10 is the time chart of the case where the pre-shift is judged to be unnecessary in the termination phase.

Firstly, in the preliminary phase, the target difference revolution speed 1 (the first target difference revolution speed Δn1) is set. Further, the actual difference revolution speed is controlled to follow this target difference revolution speed 1. At this time, for instance, in the case of the automatic transmission that requires the configuration change of the gear train by the synchro-mechanism, the control system waits for the engagement side speed gear to be set to the next speed gear by the mechanical operation.

In the changeover phase, by executing the torque distribution ratio control while maintaining (executing) the difference revolution speed control of the preliminary phase, the currently-released clutch 2 is engaged while the currently-engaged clutch 1 is being released.

In the inertia phase, the clutch of the controlled object for the difference rotation control is changed to the clutch 2. And, a locus or path of the target difference revolution speed that leads to the after-shift target difference revolution speed 2 is calculated from the current difference revolution speed of the clutch 2. The actual difference revolution speed is, then, controlled to follow this path. By the setting of the path, it is possible to set an arbitrary shift time or shift speed.

In the termination phase, the target difference revolution speed 2 is set, and the actual difference revolution speed of the clutch 2 is controlled to follow this target difference revolution speed 2. At this time, for instance, in the case of the automatic transmission that requires the configuration change of the gear train by the synchro-mechanism, the before-shift speed gear (i.e. the disengagement side speed gear that was being used until this shift) is released and provided with a predetermined amount of disengagement side torque. And also, the drag rotation control of the disengagement side shaft is executed.

(In the Case of Execution of Pre-Shift)

Figure 11:
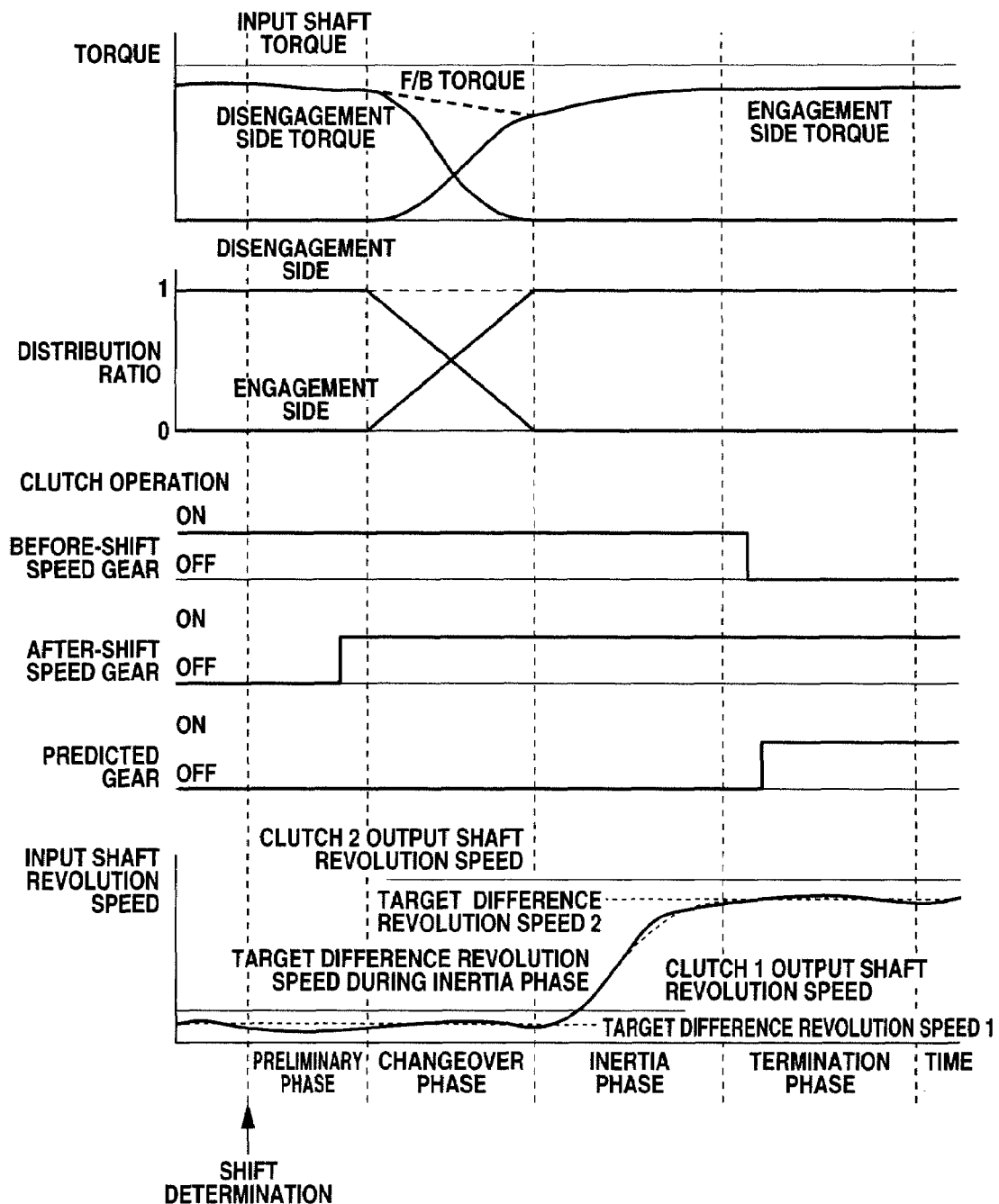
FIG. 11 is a flow chart explaining the shift control of the automatic transmission, in a case of execution of a pre-shift.

FIG. 11 is the time chart of the case where the pre-shift is judged to be necessary in the termination phase. In this time chart, only the termination phase is different from that in FIG. 10. In the case of the execution of the pre-shift, in the termination phase, the target difference revolution speed 2 of the clutch 2 is set, and the actual difference revolution speed of the clutch 2 is controlled to follow this target difference revolution speed 2. At this time, for instance, in the case of the automatic transmission that requires the configuration change of the gear train by the synchro-mechanism, the before-shift speed gear (i.e. the disengagement side speed gear that was being used until this shift) is released and the predicted gear is set.

As explained above, in the shift control of the present invention, regarding the changeover control of the clutches 1, 2 under the power-off down-shift condition, the rotation speed of the frictional engagement element is controlled while watching or checking the distribution condition of the transmission torque. That is to say, this changeover control is executed by the torque-based control and the rotation-speed-based control, which are separated from each other. Here, the respective control values or variables are finally unified or integrated, and this unified control value is output. This makes the control logic simple, and a smooth changeover operation or motion can be realized with this simple control logic.

Further, the shift control of the present invention can completely synchronize the timing between the changeover from engagement to disengagement of the clutch 1 that is being used for transmission of the power before the shift and the changeover from disengagement to engagement of the clutch 2 that is going to be used for transmission of the power after the shift. Thus, the smoother and more stable shift control can be realized without the shock. Furthermore, in the power-off condition during vehicle travel, since the clutch 1 used for transmission of the power is difference-rotation-controlled before the initiation of the shift (the clutch 2 is difference-rotation-controlled at the steady vehicle travel after the shift), the control process can shift to the changeover phase smoothly. Moreover, at this time, the output shaft of the clutch 2 that is in the disengaged condition and is not used for the power transmission is dragged in rotation direction and is rotated (in more detail, the output shaft of the clutch 2 is dragged in rotation direction and is rotated so that the clutch 2 takes or receives the predetermined amount of the torque capacity on condition that the power train element belonging to the power train associated with the clutch 2 dose not become a fully power transmission-capable condition). Therefore, the change of the revolution speed which occurs to this clutch 2 after the initiation of the shift can be lessened or reduced in advance. Hence, it is possible to shorten the time required for the shift and also improve the durability of the currently-released clutch. In addition, since this drag rotation control of the clutch 2 is executes on condition that the power train element belonging to the power train associated with the clutch 2 dose not become the fully power transmission-capable condition, a load is not put on the power train element. Here, regarding the predetermined amount provided to the clutch 2 by the drag rotation control, it is preferable that the predetermined amount should be an amount that is calculate from a revolution speed of the input member or the input shaft revolution speed of the clutch 2, and an output shaft inertia of the clutch 2.

Second Embodiment

FIGS. 12 to 15 illustrate a shift control according to a second embodiment of the present invention. In this second embodiment, the difference rotation control of the clutch is changed to a rotation speed control (revolution speed control) of the input shaft. That is, although the difference rotation control of the clutch is the control of the difference between the input rotation speed and output rotation speed of the clutch, the input rotation speed of the clutch corresponds to the rotation speed of the input shaft, while the output rotation speed of the clutch corresponds to the vehicle speed at a certain ratio according to a transmission ratio of its clutch. Here, since the vehicle speed does not change so much during the shift, it can be said that the vehicle speed is substantially constant during the shift. Therefore, the former difference rotation control of the clutch can be replaced with the latter rotation speed control of the input shaft.

In the following, with respect to the block diagram, flow chart and time chart, different points from the first embodiment will be explained.

(Control Block Diagram)

Figure 12:
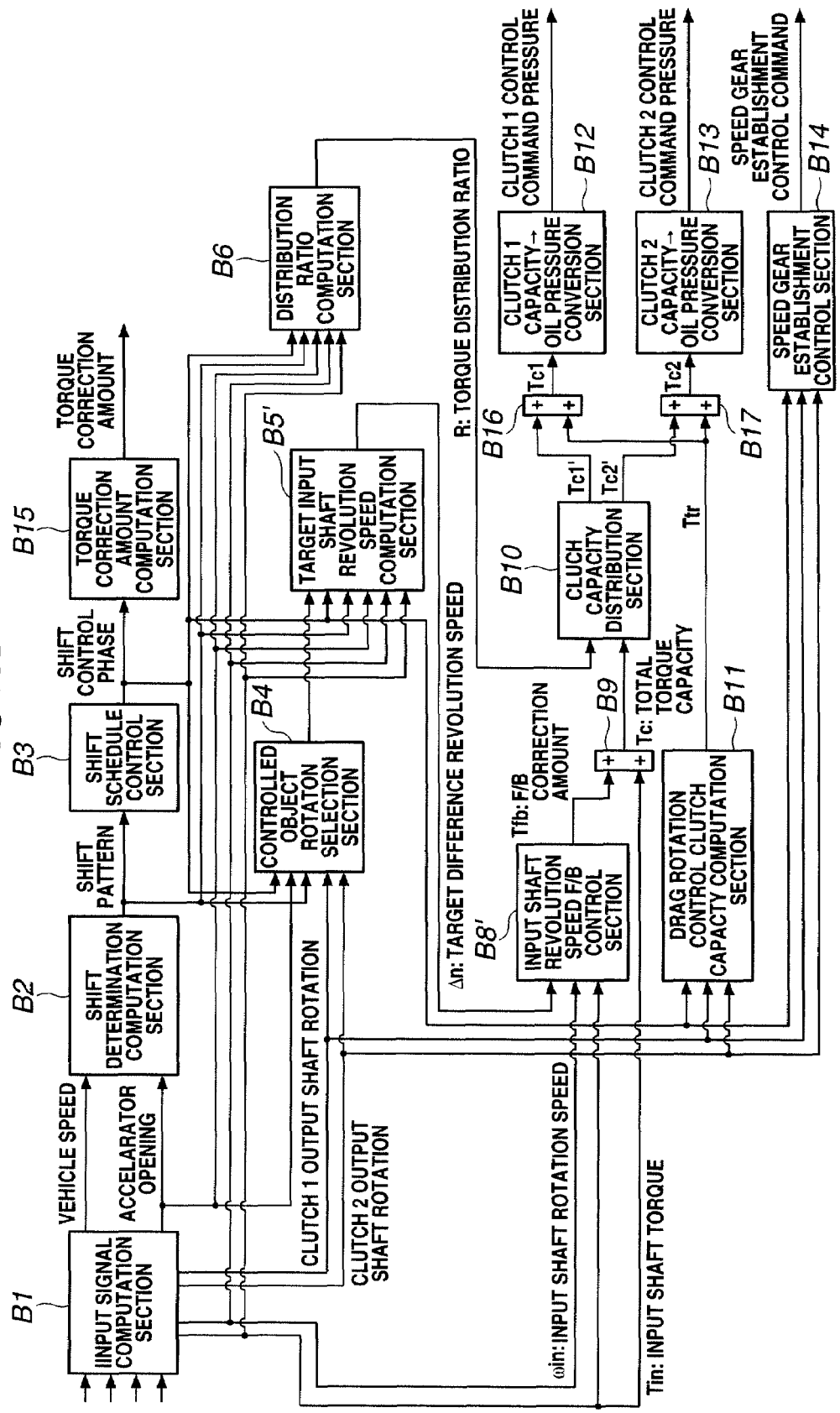
FIG. 12 is a control block diagram showing a detailed configuration of the control of the shift control apparatus for the automatic transmission according to a second embodiment.

FIG. 12 is a control block diagram showing a control configuration of the second embodiment. Regarding the differences from the first embodiment, in the first embodiment, the target difference revolution speed of the clutch of the controlled object is set, then the actual difference revolution speed is controlled. On the other hand, in the second embodiment, a target input shaft revolution speed of the clutch of the controlled object is set, and an actual input shaft revolution speed is controlled. Thus, in FIG. 12, the block B7 in FIG. 8 is removed. In addition, regarding the blocks B5 and B8, "difference revolution speed" is changed to "input shaft revolution speed", and the blocks B5, B8 are replace with blocks B5', B8'. However, only a logic that controls the actual difference revolution speed is changed to a logic that controls the actual input shaft revolution speed, and the effect of the control is the same as the first embodiment.

(Flow Chart)

Figure 13:
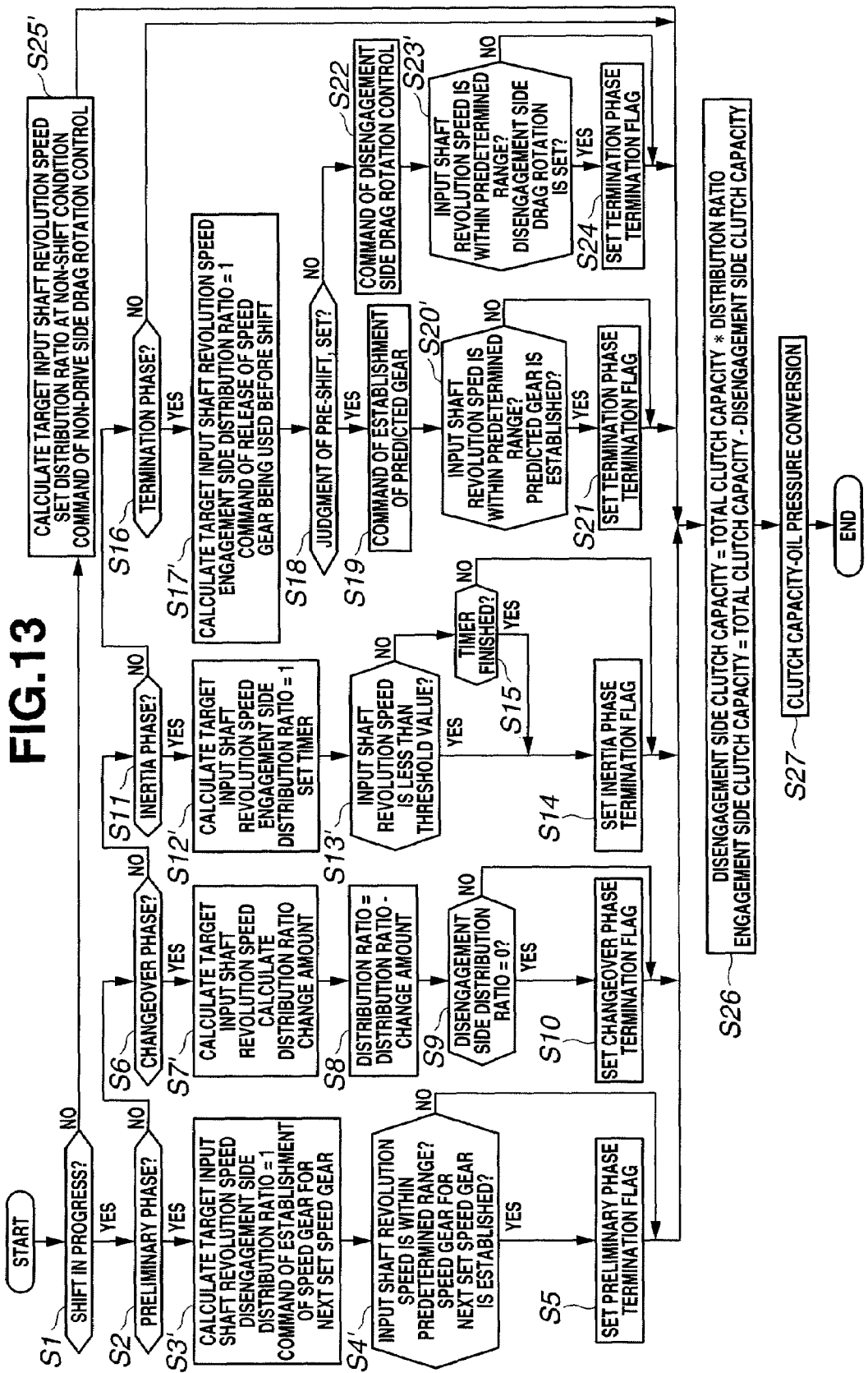
FIG. 13 is a time chart explaining an example of the shift control of the automatic transmission according to the second embodiment.

FIG. 13 illustrates a flow chart of this embodiment. As compared with FIG. 9, in each of the steps S3', S4', S7', S12', S13', S17', S20', S23' and S25', "difference revolution speed" is changed to "input shaft revolution speed". However, only the logic that controls the actual difference revolution speed is changed to the logic that controls the actual input shaft revolution speed, and the effect of the control is the same as the first embodiment.

(Time Chart)

Figure 14:
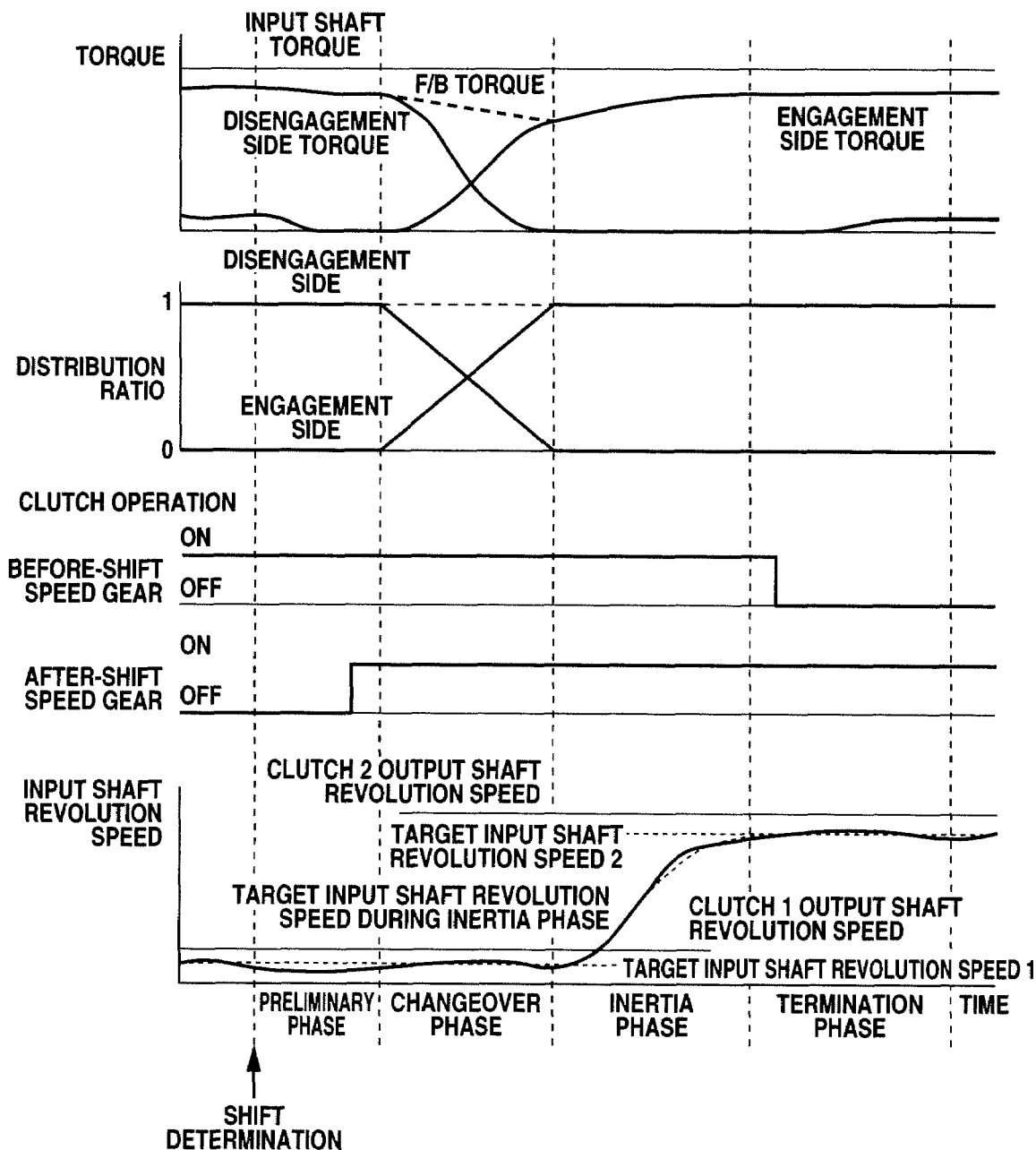
FIG. 14 is a flow chart explaining the shift control of the automatic transmission according to the second embodiment.
Figure 15:
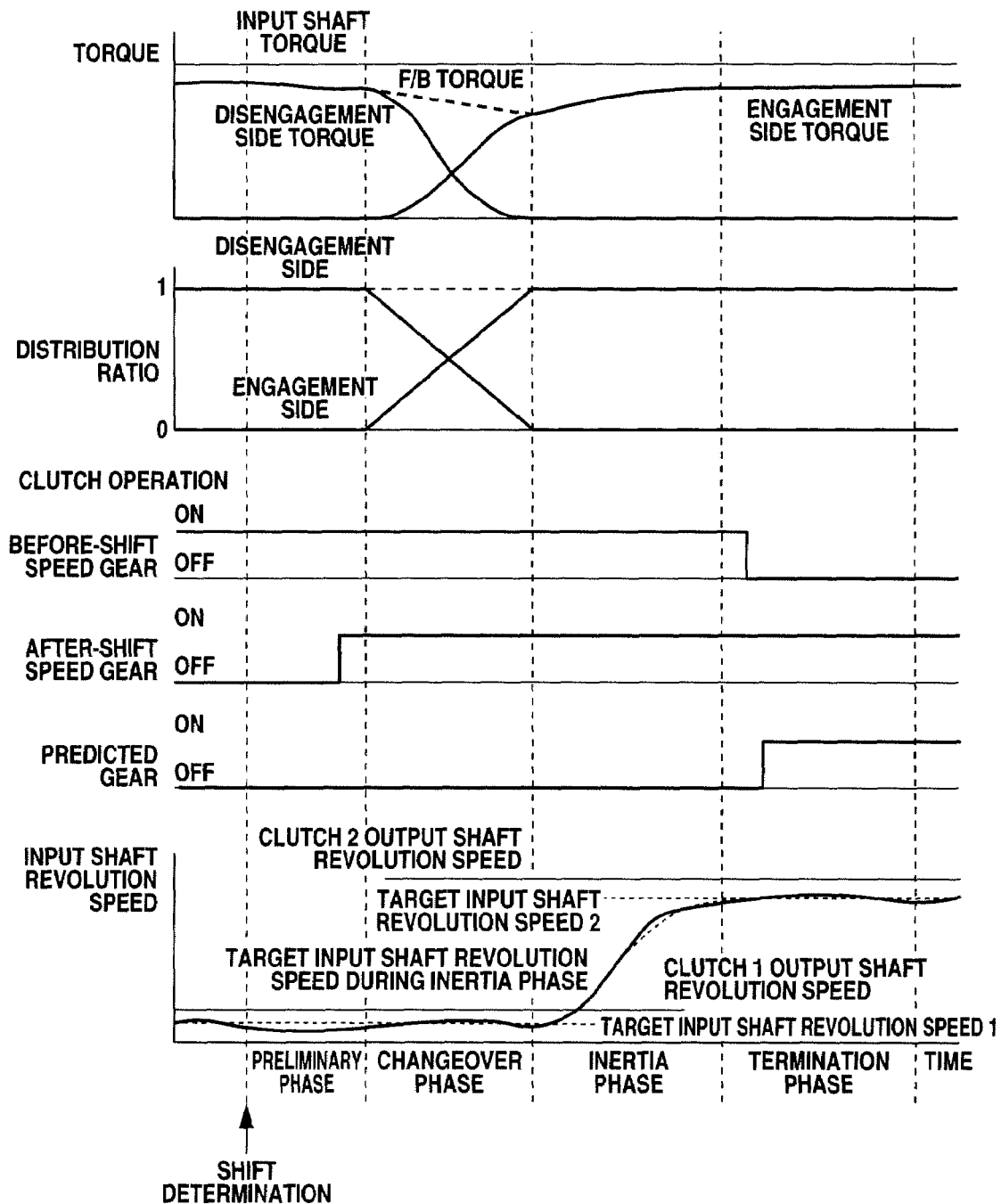
FIG. 15 is a flow chart explaining the shift control of the automatic transmission according to the second embodiment, in a case of execution of the pre-shift.

FIG. 14 is a time chart of the case where the pre-shift is judged to be unnecessary in the termination phase at the power-off down-shift in the second embodiment. FIG. 15 is a time chart of the case where the pre-shift is judged to be necessary in the termination phase at the power-off downshift. In these time charts as well, only the difference revolution speed control logic is changed to the input shaft revolution speed control logic, and the effect of the control is the same as the first embodiment (FIGS. 10, 11).

In this way, although the shift control is executed on the basis of the target revolution speed of the input shaft, the same effects as the first embodiment is obtained.

Although the invention has been described above by reference to certain embodiments of the invention, the invention is not limited to the embodiments described above. Modifications and variations of the embodiments described above will occur to those skilled in the art in light of the above teachings.

For example, in the above embodiments, frictional engagement element control system 10 uses the input shaft rotation speed as a control parameter, and executes the control of the clutches 1, 2. However, not this input shaft rotation speed itself, but other input member's rotation speed corresponding to the input shaft rotation speed could be used as the control parameter. Or, the transmission ratio might be used as the control parameter to control the clutches 1, 2. That is, to provide the difference rotation to the input-output of the clutch is also to change an apparent or dummy transmission ratio by an infinitesimal ratio (infinitesimal amount). Thus, a target transmission ratio is changed by the infinitesimal amount with respect to a before-shift or after-shift value, and the clutches 1, 2 are controlled so that the transmission ratio becomes this target transmission ratio.

Therefore in the case where the transmission ratio is used as the control parameter, the target value (this also corresponds to a control termination threshold value) of the clutch rotation at the shift is changed from the input rotation speed to the transmission ratio (the target transmission ratio) (namely that the input rotation speed is replaced with the transmission ratio, and the target transmission ratio is set as the target value).

Here, regarding the setting of the target transmission ratio (a phase termination threshold value) r1 in the preliminary phase, in a case where the target rotation speed is set to a higher rotation speed than a before-shift or after-shift input rotation speed by the predetermined rotation speed $\Delta n1$ or $\Delta n2$, the target transmission ratio is set to a higher transmission ratio than a before-shift or after-shift transmission ratio by a predetermined amount $\Delta r1$ or $\Delta r2$. Conversely, in a case where the target rotation speed is set to a lower rotation speed than a before-shift or after-shift input rotation speed by the predetermined rotation speed $\Delta n1'$ or $\Delta n2'$, the target transmission ratio is set to a lower transmission ratio than a beforeshift or after-shift transmission ratio by a predetermined amount $\Delta r1'$ or $\Delta r2'$.

In particular, in the case where the difference rotation of the clutch 2 or the input rotation speed (for instance, input shaft rotation speed) corresponding to this difference rotation is controlled to the target value, as explained by using the time chart in FIG. 10, the target value is not set to be constant, but set variably according to the lapse of time, that is, the target value path that varies according to the lapse of time is set, and the above parameter could follow this target value path (a locus or path follow control). With this, the control can be carried out with a desired shift speed or shift time.

In the first and second embodiments, the shift control apparatus and control method of the present invention are explained by using the automatic transmission shown in FIG. 7 as one example. However, the present invention can be applied to the changeover of the frictional engagement element of the various automatic transmissions having the principles explained with reference to FIGS. 1 to 5.

This application is based on a prior Japanese Patent Application No. 2006-196137 filed on Jul. 18, 2006. The entire contents of this Japanese Patent Application No. 2006-196137 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A control apparatus of an automatic transmission performing a down-shift by changeover between first and second frictional engagement elements that achieve higher and lower speed gear stages before and after the down-shift respectively during a vehicle power-off travel, comprising:

a target value determination section setting (a) each target difference revolution speed of the first and second frictional engagement elements, which is a target value of a difference in rotation speed between input and output sides of the respective frictional engagement elements, at a time of the down-shift, and (b) the target difference revolution speed for the first frictional engagement element at a steady vehicle travel before an execution of the down-shift under the power-off condition;

a total torque capacity calculation section calculating a total torque capacity required of the first and second frictional engagement elements to obtain the target difference revolution speed set by the target value determination section;

a distribution ratio determination section setting a distribution ratio of the total torque capacity to the first and second frictional engagement elements;

an individual torque capacity calculation section calculating individual torque capacities respectively required of the first and second frictional engagement elements based on the total torque capacity calculated by the total torque capacity calculation section and the distribution ratio set by the distribution ratio determination section; and an engagement control section controlling engagement conditions of the first and second frictional engagement elements in accordance with the individual torque capacity calculated by the individual torque capacity calculation section.

2. The control apparatus of the automatic transmission as claimed in claim 1, wherein:

the target value determination section sets the target difference revolution speed based on a load of an engine or an amount corresponding to the load, and a rotation input from the engine to an input member of the transmission or an amount corresponding to the rotation or a transmission ratio.

3. The control apparatus of the automatic transmission as claimed in claim 1, wherein:

a shift control at the down-shift has (a) a preliminary phase where the difference in rotation speed between the input and output sides of the first frictional engagement element is maintained at a first target difference revolution speed that is the target difference revolution speed of the first frictional engagement element;

(b) a changeover phase where a changeover of torque transmission from the first frictional engagement element to the second frictional engagement element is carried out by varying the torque capacity distribution ratio and changing each of the individual torque capacities, after the preliminary phase;

(c) an inertia phase where the engagement condition of the second frictional engagement element is controlled so that the difference in rotation speed between the input and output sides of the second frictional engagement element reaches a second target difference revolution speed that is the target difference revolution speed of the second frictional engagement element, and the rotation speed of the input side of the second frictional engagement element is gradually changed, after the changeover phase; and (d) a termination phase where the engagement condition of the second frictional engagement element is controlled so that the difference in rotation speed between the input and output sides of the second frictional engagement element is maintained at the second target difference revolution speed, after the inertia phase.

4. The control apparatus of the automatic transmission as claimed in claim 1, wherein:

the total torque capacity calculation section calculates the total torque capacity as a sum of an input torque of the transmission and a torque correction amount that is calculated from a difference between the target difference revolution speed and an actual difference revolution speed.

5. The control apparatus of the automatic transmission as claimed in claim 1, wherein:

the distribution ratio determination section sets the distribution ratio in accordance with a vehicle traveling condition or a shift condition of the automatic transmission.

6. The control apparatus of the automatic transmission as claimed in claim 1, wherein:

each of the frictional engagement elements is operated by hydraulic pressure, and the engagement control section determines control command pressures of the first and second frictional engagement elements on the basis of a pre-stored torque capacity-hydraulic pressure conversion characteristic, and controls the engagement conditions of the first and second frictional engagement elements by the control command pressures.

7. The control apparatus of the automatic transmission as claimed in claim 1, wherein:

at the steady vehicle travel, the distribution ratio determination section sets the distribution ratio so that the first frictional engagement element receives all the total torque capacity, and the engagement control section executes the control so that an actual difference revolution speed of the first frictional engagement element follows the target difference revolution speed.

8. The control apparatus of the automatic transmission as claimed in claim 7, wherein:

the automatic transmission is configured so that the down-shift is executed together with a mechanical operation of a power train element except the engagement/release of the first and second frictional engagement elements, and the engagement control section executes a drag rotation control that drags in rotation direction and rotates an output shaft of the second frictional engagement element so that the second frictional engagement element receives only a predetermined amount of the capacity on condition that the power train element belonging to a power train associated with the second frictional engagement element dose not become a fully power-transmission-capable condition at the steady vehicle travel before an initiation of the down-shift.

9. The control apparatus of the automatic transmission as claimed in claim 8, wherein:

the automatic transmission is configured so that the down-shift is executed together with the mechanical operation of the power train element except the engagement/release of the first and second frictional engagement elements, and the engagement control section controls the capacity of the second frictional engagement element to a subminimal torque capacity needed to transmit an input torque and forbids the drag rotation control of the second frictional engagement element in a case where the power train element that belongs to the power train associated with the second frictional engagement element and is used for the torque transmission after the down-shift previously becomes the power-transmission-capable condition at the steady vehicle travel before the initiation of the down-shift.

10. The control apparatus of the automatic transmission as claimed in claim 3, wherein:

in the preliminary phase,
the target value determination section sets the target difference revolution speed for the first frictional engagement element, and
the distribution ratio determination section sets the distribution ratio of the first frictional engagement element to 1 and distributes all the total torque capacity to the first frictional engagement element.

11. The control apparatus of the automatic transmission as claimed in claim 3, wherein:

one condition of termination of the preliminary phase and initiation of the changeover phase is that an actual difference revolution speed of the first frictional engagement element of a controlled object is maintained within a predetermined range close to the target difference revolution speed for only a specified time.

12. The control apparatus of the automatic transmission as claimed in claim 10, wherein:

the automatic transmission is configured so that the down-shift is executed together with a mechanical operation of a power train element except the engagement/release of the first and second frictional engagement elements, and
in the preliminary phase, a control that executes the mechanical operation of the power train element is also carried out.

13. The control apparatus of the automatic transmission as claimed in claim 12, wherein:

in the preliminary phase, the engagement control section controls the capacity of the second frictional engagement element to a subminimal torque capacity needed to transmit an input torque, and at the time of this control, the control executing the mechanical operation of the power train element is carried out.

14. The control apparatus of the automatic transmission as claimed in claim 12, wherein:

the automatic transmission is configured so that the down-shift is executed together with a mechanical operation of a power train element except the engagement/release of the first and second frictional engagement elements, and
one condition of termination of the preliminary phase and initiation of the changeover phase is that the mechanical operation of the power train element is completed.

15. The control apparatus of the automatic transmission as claimed in claim 10, wherein:

in the changeover phase,
the target value determination section maintains the target difference revolution speed set for the first frictional engagement element in the preliminary phase, and
the distribution ratio determination section increases the distribution ratio of the second frictional engagement element from 0 to 1 while diminishing the distribution ratio of the first frictional engagement element from 1 to 0.

16. The control apparatus of the automatic transmission as claimed in claim 15, wherein:

the distribution ratio determination section sets the distribution ratio in the changeover phase in accordance with a load of an engine or an amount corresponding to the load, and a rotation input from the engine to an input member of the transmission or an amount corresponding to the rotation or a transmission ratio.

17. The control apparatus of the automatic transmission as claimed in claim 3, wherein:

one condition of termination of the changeover phase and initiation of the inertia phase is that all the total torque capacity is distributed to the second frictional engagement element.

18. The control apparatus of the automatic transmission as claimed in claim 3, wherein:

in the inertia phase,
the target value determination section changes a controlled object of the target difference revolution speed from the first frictional engagement element to the second frictional engagement element, and sets the target difference revolution speed for the second frictional engagement element, and
the distribution ratio determination section sets the distribution ratio of the second frictional engagement element to 1 and distributes all the total torque capacity to the second frictional engagement element.

19. The control apparatus of the automatic transmission as claimed in claim 18, wherein:

in the inertia phase, the target value determination section sets a path of the target difference revolution speed, which leads from the target difference revolution speed before the down-shift to the target difference revolution speed after the down-shift, based on a load of an engine or an amount corresponding to the load, and a rotation input from the engine to an input member of the transmission or an amount corresponding to the rotation or a transmission ratio, and executes the control so that an actual difference revolution speed follows the path of the target difference revolution speed.

20. The control apparatus of the automatic transmission as claimed in claim 3, wherein:

one condition of termination of the inertia phase and initiation of the termination phase is that the revolution speed of the second frictional engagement element reaches a control termination threshold value, or a predetermined time elapses from an initiation of the inertia phase.

21. The control apparatus of the automatic transmission as claimed in claim 3, wherein:

in the termination phase,
the target value determination section maintains a controlled object of the target difference revolution speed at the second frictional engagement element, and sets the target difference revolution speed for the second frictional engagement element, and
the distribution ratio determination section sets the distribution ratio of the second frictional engagement element to 1 and distributes all the total torque capacity to the second frictional engagement element.

22. The control apparatus of the automatic transmission as claimed in claim 3, wherein:

one condition of termination of the termination phase is that a difference revolution speed of the second frictional engagement element of a controlled object is maintained within a predetermined range for only a specified time.

23. The control apparatus of the automatic transmission as claimed in claim 3, wherein:

the automatic transmission is configured so that the down-shift is executed together with a mechanical operation of a power train element except the engagement/release of the first and second frictional engagement elements, and
a control is executed in which the power train element belonging to a power train associated with the first frictional engagement element becomes a power-transmission-release condition in the termination phase.

24. The control apparatus of the automatic transmission as claimed in claim 3, wherein:

the automatic transmission is configured so that the downshift is executed together with a mechanical operation of a power train element except the engagement/release of the first and second frictional engagement elements, and in a case where a next another shift control is judged to be carried out shortly in the termination phase, an establishment of a predicted speed gear stage is executed where the mechanical operation of the power train element, required to achieve a next another speed gear stage, is carried out in advance.

25. The control apparatus of the automatic transmission as claimed in claim 24, wherein:

in a case where the next another shift control is judged not to be carried out shortly in the termination phase, after the power train element associated with the first frictional engagement element is released, a drag rotation control that provides only a predetermined amount of the capacity to the first frictional engagement element and drags in rotation direction and rotates an output shaft of the first frictional engagement element is executed.

26. The control apparatus of the automatic transmission as claimed in claim 24, wherein:

one condition of termination of the termination phase is that a drag rotation control that drags in rotation direction and rotates an output shaft of the first frictional engagement element is executed after the power train element associated with the first frictional engagement element is released.

27. The control apparatus of the automatic transmission as claimed in claim 1, wherein:

the target value determination section sets an input member target revolution speed that is a rotation target value of an input member of the transmission, which corresponds to the target difference revolution speed, to be lower than an output revolution speed of the frictional engagement element of a controlled object, and the total torque capacity calculation section calculates the total torque capacity required of the first and second frictional engagement elements in order for an actual revolution speed of the input member to become the target revolution speed set by the target value determination section.

* * * * *